(12) United States Patent
Wu et al.

(10) Patent No.: US 11,165,872 B2
(45) Date of Patent: Nov. 2, 2021

(54) METHOD AND DEVICE FOR REQUESTING REMOTE SERVICE

(71) Applicant: BANMA ZHIXING NETWORK (HONGKONG) CO., LIMITED, Kowloon (HK)

(72) Inventors: Wei Wu, Beijing (CN); Wei Ye, Hangzhou (CN); Shouli Sun, Beijing (CN); Kai Zhang, Beijing (CN); Yixing Zhang, Beijing (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 183 days.

(21) Appl. No.: 16/138,200

(22) Filed: Sep. 21, 2018

(65) Prior Publication Data
US 2019/0082019 A1    Mar. 14, 2019

Related U.S. Application Data

(63) Continuation-in-part of application No. PCT/CN2017/076398, filed on Mar. 17, 2017.

(30) Foreign Application Priority Data

Mar. 23, 2016    (CN) .......................... 201610170406.3

(51) Int. Cl.
*G06F 15/16*    (2006.01)
*H04L 29/08*    (2006.01)
(Continued)

(52) U.S. Cl.
CPC ........ *H04L 67/16* (2013.01); *G08B 13/19602* (2013.01); *G08B 13/19656* (2013.01);
(Continued)

(58) Field of Classification Search
CPC ....... H04L 67/16; H04L 69/322; H04L 67/10; H04L 69/22; H04L 29/08; H04L 69/329;
(Continued)

(56) References Cited

U.S. PATENT DOCUMENTS

| | | | |
|---|---|---|---|
| 4,680,581 A | 7/1987 | Kozlik | |
| 5,379,337 A | 1/1995 | Castillo | |

(Continued)

FOREIGN PATENT DOCUMENTS

| | | |
|---|---|---|
| CN | 103491569 A | 1/2014 |
| CN | 104247513 A | 12/2014 |
| CN | 105027628 A | 11/2015 |

*Primary Examiner* — Anh Nguyen
(74) *Attorney, Agent, or Firm* — Van Pelt, Yi & James LLP

(57) ABSTRACT

The present application provides a method, device, and system for requesting remote services. The method includes determining, by one or more processors, a special request frame, the special request frame comprising an extensible field, the extensible field comprising remote service request information, and the special request frame being a frame for terminal-access point mutual discovery according to a communication protocol for communication between a terminal and an access point, communicating the special request frame to an access point, and obtaining, by the one or more processors, information pertaining to a remote service provided by a service, the information pertaining to the remote service being based at least in part on the remote service request information.

23 Claims, 20 Drawing Sheets

(51) Int. Cl.
*G08B 25/08* (2006.01)
*G08B 13/196* (2006.01)
*H04W 48/14* (2009.01)
*G08B 25/10* (2006.01)
*H04L 29/06* (2006.01)
*H04W 12/069* (2021.01)
*H04W 4/80* (2018.01)
*G08B 25/01* (2006.01)
*H04W 12/06* (2021.01)
*H04W 84/12* (2009.01)
*H04W 12/60* (2021.01)
*H04W 48/16* (2009.01)

(52) U.S. Cl.
CPC ........... *G08B 25/014* (2013.01); *G08B 25/08* (2013.01); *G08B 25/10* (2013.01); *H04L 29/08* (2013.01); *H04L 67/12* (2013.01); *H04L 69/22* (2013.01); *H04L 69/329* (2013.01); *H04W 4/80* (2018.02); *H04W 12/06* (2013.01); *H04W 12/069* (2021.01); *H04W 48/14* (2013.01); *H04L 69/322* (2013.01); *H04W 12/66* (2021.01); *H04W 48/16* (2013.01); *H04W 84/12* (2013.01)

(58) Field of Classification Search
CPC ... H04L 67/12; G08B 13/19656; G08B 25/10; G08B 13/19602; G08B 25/08; G08B 25/014; H04W 4/80; H04W 12/00506; H04W 84/12; H04W 48/16; H04W 48/14; H04W 12/0609; H04W 12/06

USPC ........................................................ 709/217
See application file for complete search history.

(56) References Cited

U.S. PATENT DOCUMENTS

| | | | |
|---|---|---|---|
| 6,047,005 A | 4/2000 | Sherman | |
| 9,131,361 B2 | 9/2015 | Ray | |
| 2006/0155851 A1* | 7/2006 | Ma | H04L 12/2836 709/226 |
| 2007/0086417 A1 | 4/2007 | Jang | |
| 2007/0207835 A1* | 9/2007 | Crocker | H04W 76/10 455/557 |
| 2009/0232096 A1 | 9/2009 | Taniuchi | |
| 2011/0281609 A1 | 11/2011 | Kuo | |
| 2011/0307490 A1* | 12/2011 | Chow | H04L 61/305 707/741 |
| 2013/0281056 A1* | 10/2013 | Abraham | H04W 48/16 455/411 |
| 2013/0294331 A1 | 11/2013 | Wang | |
| 2014/0071900 A1 | 3/2014 | Park | |
| 2014/0086124 A1 | 3/2014 | Knowles | |
| 2014/0219194 A1* | 8/2014 | Varoglu | H04W 76/23 370/329 |
| 2015/0173015 A1 | 6/2015 | Lee | |
| 2015/0382171 A1* | 12/2015 | Roy | H04W 48/16 370/329 |
| 2016/0353382 A1* | 12/2016 | Xue | H04W 72/1247 |
| 2017/0180357 A1* | 6/2017 | Ghosh | H04W 4/70 |
| 2018/0054723 A9* | 2/2018 | Wentink | H04W 76/10 |

* cited by examiner

300

400

450

500

550

600

650

750

825

850

875

METHOD AND DEVICE FOR REQUESTING REMOTE SERVICE

CROSS REFERENCE TO OTHER APPLICATIONS

This application is a continuation-in-part of and claims priority to International (PCT) Application No. PCT/CN2017/076398 entitled METHOD AND DEVICE FOR REQUESTING REMOTE SERVICE, filed Mar. 13, 2017 which is incorporated herein by reference in its entirety for all purposes, which claims priority to China Patent Application No. 201610170406.3 entitled METHOD AND MEANS FOR REQUESTING REMOTE SERVICES filed on Mar. 23, 2016 which is incorporated by reference in its entirety for all purposes.

FIELD OF THE INVENTION

The present application relates to a field of communication technology. In particular, the present application relates to a method, system, and device for requesting remote services.

BACKGROUND OF THE INVENTION

Transmission of messages between terminals and between a terminal and a server generally pass through a seven-layer Open System Interconnection (OSI) architecture. When a terminal is to transmit a message, message content formed by the application layer and the presentation layer passes through a layer-by-layer encapsulation with respect to three intermediate layers (i.e., a session layer, a transport layer, and a network layer) such that the message content is encapsulated into a message suitable for transportation across a network. The message (e.g., the message corresponding to the encapsulated message content) is sent by a data link layer and a physical layer. Layer-by-layer encapsulation generally requires significant communication overhead. In addition, under some conditions of resource constraint, such as when connection to a trusted network is not possible (e.g., a trusted network not being available for communication), a message that has been formed through the application and presentation layers will not be able to skip over the network layer to be sent by the data link layer and the physical layer. As a result, in some situations, such as in some situations of resource constraint, the seven-layer OSI architecture cannot operate normally and is unable to perform normal communications and transfers.

In view of the above, there is a need for a method, device, and system for more efficiently and effectively performing network communication.

BRIEF DESCRIPTION OF THE DRAWINGS

Various embodiments of the invention are disclosed in the following detailed description and the accompanying drawings.

The features, objectives, and advantages of the present application will become more apparent through reading the detailed descriptions of the non-restrictive embodiments made with reference to the figures below.

DETAILED DESCRIPTION

Figure 1:
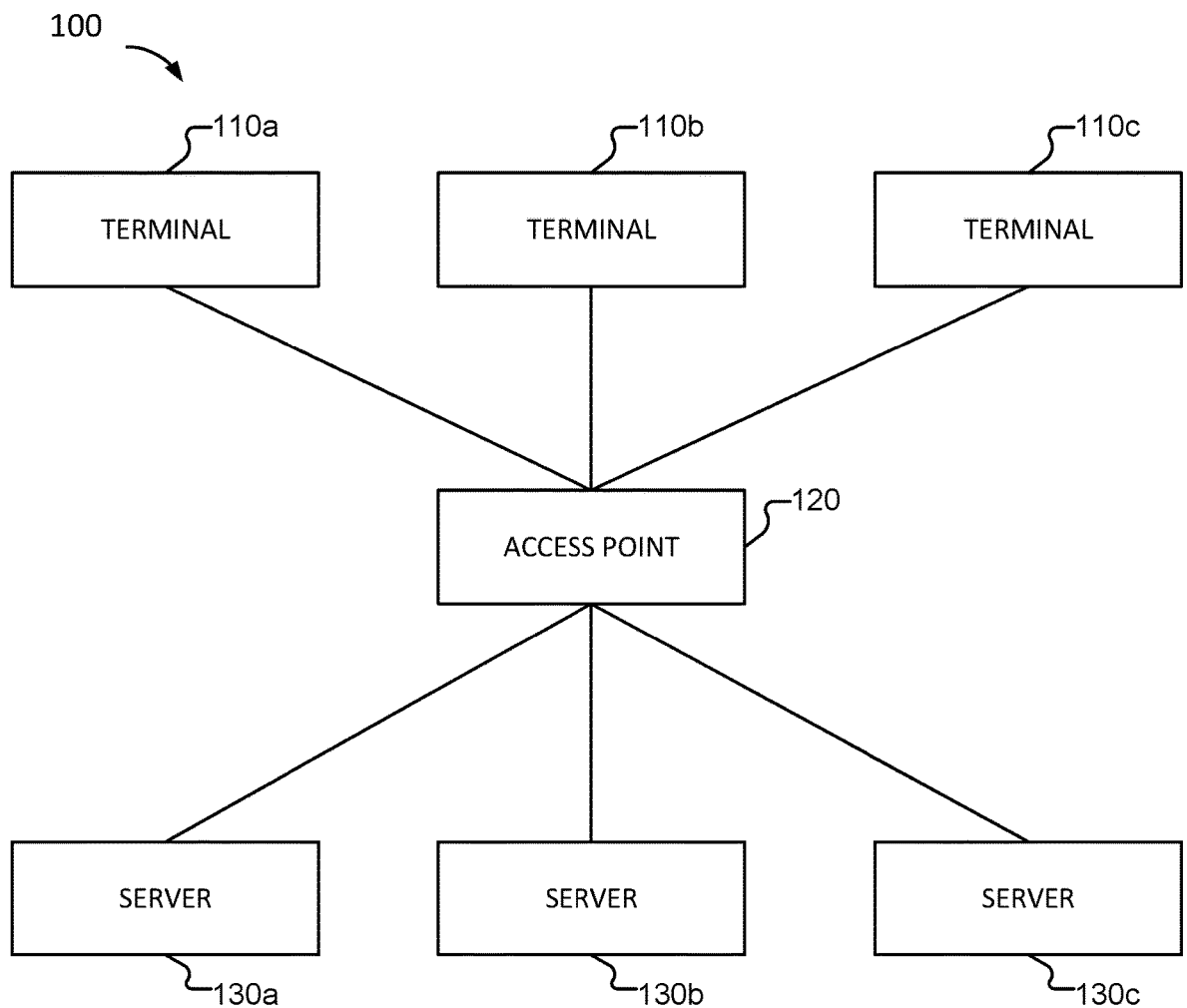
FIG. 1 is a diagram of a wireless network environment according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Before discussing exemplary embodiments in greater detail, we should mention some exemplary embodiments described as flowchart-depicted processing or methods. Although the flowcharts describe each operation sequentially, many of the operations could be implemented in parallel or simultaneously. In addition, the sequence of each operation could be re-arranged. When its operations are completed, said processing may be terminated. Yet there may also be supplementary steps not included in the drawings. Said processing may correspond to methods, functions, rules, subroutines, sub-programs, and so on.

Computer devices include user devices and network devices. The user devices include, but are not limited to, computers, smart phones, and personal digital assistants (PDAs). The network devices include, but are not limited to, single network servers, server groups organized from multiple network servers, and clouds consisting of a large number of cloud computing-based computers or network servers. Cloud computing can refer to a form of distributed computing by a super virtual computer composed of loosely coupled computers.

Various embodiments can be implemented by computer devices. Some embodiments are implemented by computer devices running alone. Some embodiments are implemented by computer devices that connect to a network and interoperate with other computer devices on the network. The networks on which the computer devices are located include, but are not limited to, the Internet, wide area networks, metropolitan area networks, local area networks, and virtual private networks (VPNs).

The user device can be a terminal. As used herein, a terminal generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, information centers (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a kiosk such as a vending machine, a smart home appliance, vehicle-mounted mobile stations, or the like. A terminal can run various operating systems.

In some embodiments, a terminal has multimedia functions. A terminal can support audio, video, data, and other such functions. The terminal can have a touchscreen. The terminal can correspond to a smart mobile device such as a smart phone, a tablet computer, or a smart wearable device, or a smart television, personal computer, or other such device with a touchscreen. Various operating systems such as Linux, Android, iOS, YunOS, tvOS, and Windows can be implemented on the smart terminal. A terminal can be connected to one or more networks such as the Internet, a WiFi network, a Local Area Network (LAN), a Wide Area Network (WAN), a telecommunications network, etc.

A terminal can be connected to one or more peripherals (e.g., smart peripherals). For example, the terminal can be connected to one or more peripherals via a Bluetooth connection, a WiFi direct connection, an infrared connection, a ZigBee connection, a Bluetooth Low Energy (BLE) connection, a WiMax connection, a Low Power Radio (LPR) connection, a Near Field Communications (NFC) connection, etc.

Please understand that the user devices, network devices, terminals, and networks are merely examples. Other computer devices, network devices, terminals, or networks, whether currently existing or possibly appearing in the future, may be implemented in connection with the present application and should also be contained within the protective scope of the present application and are contained herein through referencing them.

Various embodiments are implemented through hardware, software, firmware, middleware, microcode, hardware description language, or any combination thereof. Some embodiments are implemented through hardware, software, firmware, middleware, microcode, hardware description language, or any combination thereof. Some embodiments are implemented through software, firmware, middleware, or microcode, the program code or code segment used to implement the necessary tasks can be stored on a machine or computer-readable medium (e.g., a storage medium). One or more processors can implement various embodiments. According to various embodiments, a process is implemented using one or more processors. As an example, one or more steps in a process of an embodiment hereof is implemented by one or more processors.

The specific structures and function details disclosed here are merely representative and are used for the purpose of describing various embodiments of the present application. However, other implementations of various embodiments are possible. Moreover, it should not be interpreted as being merely limited to the embodiments set forth here.

Please understand that although the terms "first," "second," and so on are used to describe various units, these units should not be limited by these terms. These terms are used only in order to differentiate one unit from another. To give an example, so long as terms do not depart from the scope of the exemplary embodiment, a first unit may be referred to as a second unit, and similarly a second unit may be referred to as a first unit. The term "and/or" used here includes any or all combinations of one or more listed related items.

Please understand that when one unit is indicated as being "connected" or "coupled" to another unit, such one unit can be directly connected or coupled to such other unit, or one or more other units can exist in between such one unit and such other unit. In contrast, when one unit indicated as being "directly connected" or "directly coupled" to another unit, no intervening unit exists between such one unit and such other unit. Other wording used to describe the relationships between units should be similarly understood (e.g., "located between" versus "directly located between" and "adjacent to" versus "directly adjacent to").

The terms used here only have the purpose of describing specific embodiments and are not intended to restrict exemplary embodiments. Unless otherwise made explicit by the context, the singular forms "a" or "an" used here are also intended to include the plural. Please also understand that the terms "comprise" and/or "contain" as used here specify the existence of the stated features, integers, steps, operations, units and/or components and do not exclude the existence or the addition of one or more other features, integers, steps, operations, units, components, or combinations thereof.

Also deserving of mention is the fact that, in some alternative implementations, the mentioned functions/actions may occur according to a sequence other than that indicated in the drawings. For example, depending on the functions/actions, two pictures that are depicted in sequence may be executed basically at the same time or sometimes executed according to the opposite sequence.

The technical scheme of the present application is described in further detail below in light of the drawings.

FIG. 1 is a diagram of a wireless network environment according to various embodiments of the present application.

Referring to FIG. 1, system 100 is provided. System 100 can be implemented in connection with process 200 of FIG. 2, process 900 of FIG. 9, process 1000 of FIG. 10, and/or process 1100 of FIG. 11. For example, system 100 can implement all or part of process 200 of FIG. 2, process 900 of FIG. 9, process 1000 of FIG. 10, and/or process 1100 of FIG. 11. System 100 can be implemented in connection with architecture 300 of FIG. 3A, special request frame 400 of FIG. 4A, special response frame 450 of FIG. 4B, special request frame 500 of FIG. 5A, special response frame 550 of FIG. 5B, special request frame 600 of FIG. 6A, special response frame 650 of FIG. 6B, special request frame 700 of FIG. 7A, special response frame 750 of FIG. 7B, special request frame 800 of FIG. 8A, special request frame 825 of FIG. 8B, special response frame 850 of FIG. 8C, and/or special response frame 875 of FIG. 8D. System 100 can be implemented at least in part by computer system 1200 of FIG. 12.

System 100 comprises one or more terminals 110 (e.g., denoted by terminal 110a, terminal 110b, and terminal 110c) and one or more servers 130 (e.g., denoted by server 130a, server 130b, and server 130c). According to various embodiments, one or more terminals 110 communicate with the one or more servers 130. For example, one or more terminals 110 communicate with the one or more servers 130 in connection with obtaining one or more services. The one or more services can include obtaining a file or other information, providing a file or other information, obtaining information in connection with a location-based service (LBS service), etc. Other services are possible.

According to various embodiments, one or more terminals 110 communicate with one or more servers 130 via access point (AP) 120. A terminal can communicate (e.g., send) remote service requests to a server via an access point. For example, one or more terminals 110 send remote service requests via AP 120 to various types of one or more servers 130. The one or more servers 130 can provide various types of service. In response to receiving the remote service request from one or more terminals 110, AP 120 can send the remote service request to a corresponding one or more servers 130. The remote service request can comprise information indicating a server to which the remote service request is to be sent. For example, a header or other metadata pertaining to the remote service request identifies the server to which the remote service request is to be sent. In some embodiments, information indicating the server to which a remote service request is to be sent is communication in connection with the remote service request. One or more servers 130 can receive the remote service request from the access point. In response to receiving the remote service request, one or more servers 130 can provide a corresponding remote service. According to various embodiments, one or more terminals 110 obtain the remote services provided by one or more servers 130. The one or more terminals 110 can receive the remote services provided by one or more servers 130 via AP 120.

According to conventional art, when terminal 110 (e.g., a terminal of terminal 110a, terminal 110b, and 110c) sends a remote service request, the content of the remote service request undergoes layer-by-layer encapsulation in the session layer, the transport layer, and the network layer of a seven-layer OSI architecture. Encapsulation of the content of the remote service request is further illustrated in FIG. 3A. The content of the remote service request is thus encapsulated into a message suitable for transportation across the network. The message corresponding to the encapsulated content of the remote service request can then be sent to the server. Encapsulation methods using convention implementations generally require large communication overheads and are infeasible under special circumstances (such as situations of resource constraint). The encapsulation of the remote service request comprises adding header fields to the content from the previous layer. The encapsulation of the remote service request can be performed automatically by a standard protocol library. As an example, suppose a terminal is to query for information pertaining local weather (e.g., the access point receive a weather service request from the terminal), the application within the access point forwards the service request to a web server (e.g. "weather.online.com"). If the web server support the HTTP protocol, the request is encapsulated with the HTTP protocol, and similar to a URL request.

According to various embodiments, a terminal and an access point engage in mutual discovery. For example, the terminal and the access point continually detect each other. As an example, the WiFi protocol comprises a probe frame and an authentication frame mechanism that are used in connection with performing the mutual discovery in WiFi protocol implementations. As another example, Bluetooth protocol comprises a special discovery frame mechanism that can be used in connection with performing the mutual discovery in Bluetooth protocol implementations. The mutual discovery mechanism (e.g., of the WiFi protocol, the Bluetooth protocol, and various other protocols) enables a terminal to discover and re-establish communication (e.g., normal communication) when a network connection is restored.

As used herein, a frame refers to a digital data transmission unit and can include one or more network packets. Various embodiments use an extensible field in a special request frame to include remote service request information. The remote service request information can include information pertaining to a service type and/or a parameter of the service request (e.g., a location can be a parameter of the service request for a weather service). According to various embodiments, an extensible field in a special request frame that is used in connection with a mutual discovery mechanism of the terminal and the access point is used to comprise remote service request information. The extensible field can correspond to a variable length content in the WiFi frame, which could be valid for the embedded data (e.g., the field "challenge text" of the "authentication" frame). The remote service request information can be used to determine a server to which the request is to be sent (e.g., the server from which a service is requested). For example, the remote service request information can indicate the server to which the request is to be sent. The remote service request can comprise an identifier (e.g., a unique identifier at least among servers, an address, etc.) associated with the server to which the request is to be sent. According to various embodiments, the access point determines the server to which the request is to be sent. For example, in response to receiving the special request frame, an access point can determine the server to which the request is to be sent. The access point can determine the server to which the request is to be sent based at least in part on the remote service request information. For example, the access point obtains an identifier associated with the server to which the request is to be sent (e.g., an address, a server name, a requested service, an identifier of the requested service, a server identifier such as a MAC address, etc.). As another example, the access point obtains a service that is requested, and determines a server to which the request is to be sent based at least in part on a mapping of services to servers (or a mapping of identifiers associated with services to identifiers associated with servers). According to various embodiments, the access point uses the remote service request information as a basis to determine (e.g., to find on behalf of the terminal) a server for the service requested by the terminal. According to various embodiments, in response to determining the server (e.g., for the service requested by the terminal), the access point implements a request remote service in a manner through the seven-layer OSI architecture.

Figure 2:
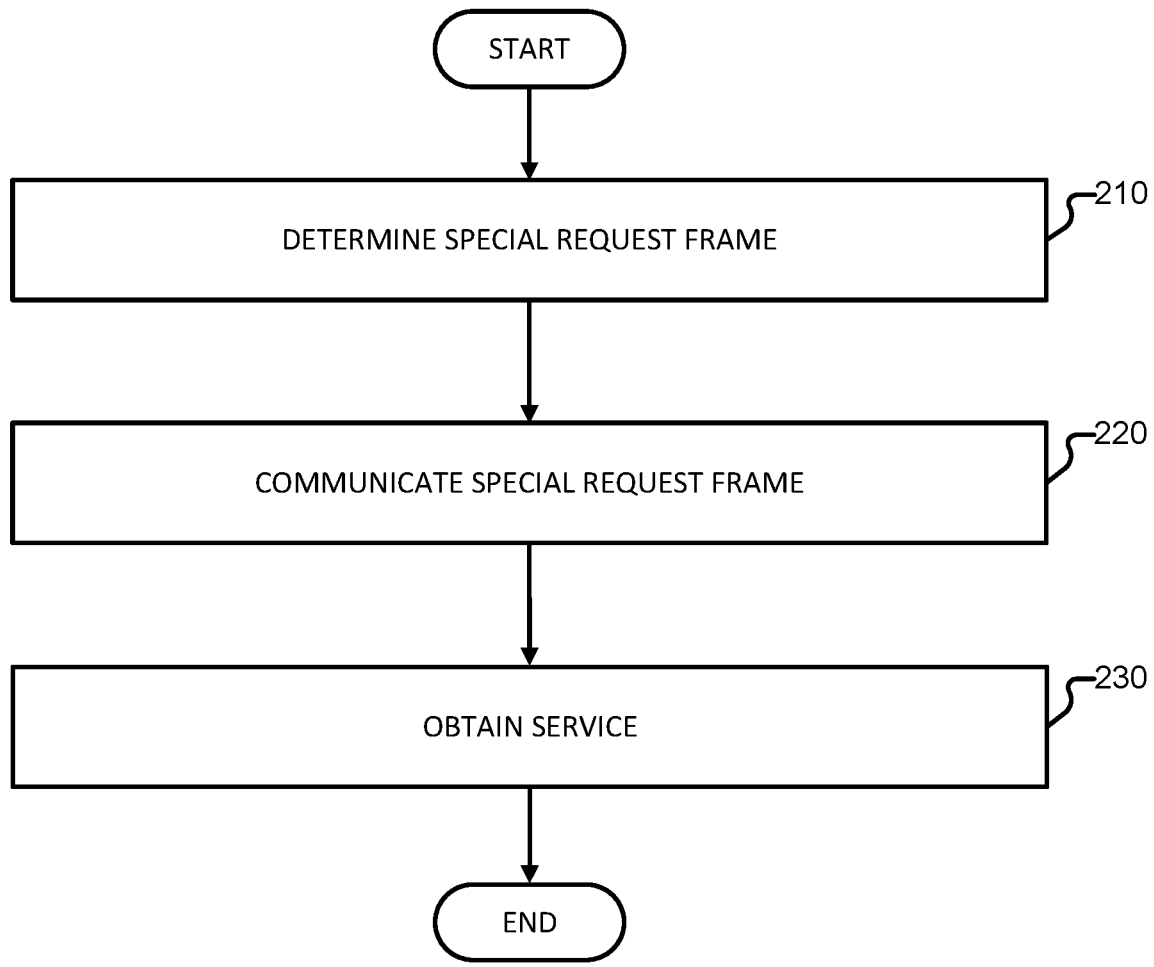
FIG. 2 is a flowchart of a method for requesting remote services according to various embodiments of the present application.

FIG. 2 is a flowchart of a method for requesting remote services according to various embodiments of the present application.

Referring to FIG. 2, process 200 is provided. Process 200 can be implemented in connection with process 900 of FIG. 9, process 1000 of FIG. 10, and/or process 1100 of FIG. 11. Process 200 can be implemented in connection with architecture 300 of FIG. 3A, special request frame 400 of FIG. 4A, special response frame 450 of FIG. 4B, special request frame 500 of FIG. 5A, special response frame 550 of FIG. 5B, special request frame 600 of FIG. 6A, special response frame 650 of FIG. 6B, special request frame 700 of FIG. 7A, special response frame 750 of FIG. 7B, special request frame 800 of FIG. 8A, special request frame 825 of FIG. 8B, special response frame 850 of FIG. 8C, and/or special response frame 875 of FIG. 8D. Process 200 can be implemented at least in part by system 100 of FIG. 1, and/or computer system 1200 of FIG. 12.

According to various embodiments, process 200 is implemented by a terminal. In some embodiments, process 200 is implemented by a user device.

At 210, a special request frame is obtained. In some embodiments, the terminal determines the special request frame. In response to obtaining a request for a service (e.g., an indication that the terminal is to request a service), the terminal can obtain remote service request information and generate a special request frame. For example, the special request frame can be generated based at least in part on the remote service request information. The generating of the special request frame includes adding the remote service request information to an extensible field (e.g., a header field, a footer field, or other metadata field) in a special request frame. According to various embodiments, the terminal can store a template for a special request frame or a predefined special request frame format. In response to determining that a special request frame is to be generated, the terminal can generate the special request frame such that an extensible field of the special request frame comprises the remote service request information.

According to various embodiments, the extensible field is used in connection with mutual discovery between the terminal and access point. For example, the communication protocol according to which the terminal and/or access point communicates can indicate that the terminal and/or access point is to use information comprised in the extensible field for mutual discovery between the terminal and access point. The service pertaining to the mutual discovery between the terminal and the access point can have different parts such as service discovery and service request. The service discovery is associated with determining whether the AP has the interested service or not. The service request is associated with the main procedure to get the service. As an example, the WiFi "probe request/response" are used for the service discovery and the "association/authentication" frames for the service request and response.

According to various embodiments, process 200 is invoked in response to the terminal determining that a remote service is to be obtained. For example, in response to a user input, the terminal determines that a remote service is to be obtained (e.g., from a server) and the terminal can invoke process 200. In some embodiments, process 200 is invoked in response to an application on the terminal being launched or in response to an application on the terminal requesting a remote service.

The request for the remote service or the determining that a remote service is to be performed can be used in connection with determining the remote service request information. As an example, the request for the remote service comprises an identifier indicating a remote service to be performed and/or requested, and the identifier indicating the remote service is included in the remote service request information.

At 220, the special request frame is communicated. In some embodiments, the terminal communicates the special request frame. For example, the terminal sends the special request frame to an access point and/or a server. If the terminal communicates the service request frame to the access point, the access point can determine a corresponding server and send the request for the service to the server.

At 230, a service is obtained. In some embodiments, the terminal obtains a service from a server. As an example, the terminal can receive a location-based service from the server. In connection with providing a service, the server can communicate information associated with the service to the terminal and the terminal can communicate information required to carry out the service to the server.

Various embodiments are implemented in contexts according to which a communication connection cannot be established with a server. For example, if a terminal cannot establish a communication connection with the service because of resource constraints, various embodiments are implemented to request and/or obtain remote services. Contexts in which various techniques can be implemented include inability to connect to a trusted network, unable to establish a network connection because of lack of processing resources and/or power (e.g., lack of battery power remaining), absence of a module supporting launch of the remote service, etc.

Various embodiments are implemented in contexts according to which a terminal is unable to connect with a trusted network. A terminal can be deemed to be unable to connect with a trusted network if no trusted network is detected (e.g., if the terminal is not within the range of a trusted network). In some embodiments, a terminal is deemed to be unable to connect with a trusted network if the terminal has attempted to connect to a trusted network but is unable to do so (e.g., for lack of appropriate credentials or authentication, as a result of a technical problem, as a result of a poor network connection status, etc.). In some embodiments, a terminal is deemed to be unable to connect with a trusted network if the terminal lacks ability to connect to the trusted network. Various embodiments are implemented in contexts according to which the terminal is unable to connect with a trusted network and the terminal is unable to establish a communication connection with a remote server.

Various embodiments are implemented in contexts according to which a terminal is unable to establish a network connection. A context according to which a terminal is unable to establish a network connection can include a terminal being unable to establish a network connection because of insufficient power (e.g., insufficient battery charge, etc.). In response to determining that the terminal is unable to establish a network connection (e.g., because of insufficient power), the terminal can invoke various embodiments. For example, in response to determining that the terminal is unable to establish a network connection, the terminal can invoke process 200 of FIG. 2, process 900 of FIG. 9, process 1000 of FIG. 10, and/or process 1100 of FIG. 11.

Various embodiments are implemented in contexts according to which a terminal does not have a module supporting the launch of the remote service. For example, a terminal can be deemed to not have the module supporting the launch of the remote service if the terminal does not have a positioning module in connection with requesting a location-related service (e.g., an LBS service). In response to determining that the terminal lacks a module that is to be used in connection with launching a remote service, various embodiments can be invoked. According to various embodiments, the access point serves as the server proxy of the remote web server and the terminal, in case that the terminal has not required conditions for the web service, such as IP connection or hardware module.

Various embodiments are effective at least when implemented in contexts according to which a terminal cannot establish a communication connection with a server because of terminal resource constraints. Generally, in a context of limited resources (e.g., limited terminal resources such as processing or power constraints), the terminal is unable to establish a connection with a trusted network. As a result of the terminal being unable to establish a connection with a trusted network, a message that has been formed through the application and presentation layers in a seven-layer OSI architecture (e.g., a message corresponding to encapsulated content of a remote service request) will not be able to skip over the network layer to be sent by the data link layer and the physical layer. As an example, service is provided over 802.11 control frames without IP or HTTP. As a result, the seven-layer OSI architecture cannot operate normally when a terminal is unable to establish a connection with a trusted network. In addition, conventional art lacks a mechanism capable of requesting a remote service in a context according to which a communication connection cannot be established with a server because of terminal resource constraints.

Figure 3A:
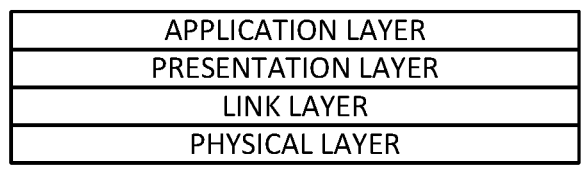
FIG. 3A is a diagram of a four-layer Open Systems Interconnection (OSI) architecture according to various embodiments of the present application.
Figure 3B:
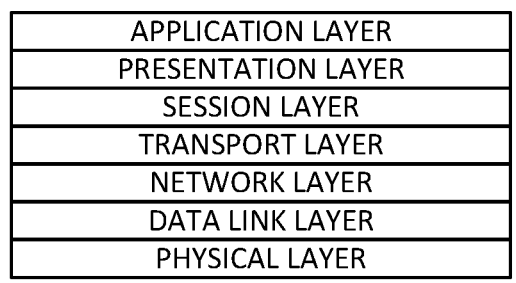
FIG. 3B is a diagram of a seven-layer OSI architecture according to related art.

Various embodiments establish a five-layer OSI architecture (e.g., the five-layer OSI architecture 350 of FIG. 3B). According to various embodiments, the session layer, the transport layer, and the network layer of the seven-layer OSI architecture of the conventional art is replaced with a service discovery acquisition layer.

FIG. 3A is a diagram of a four-layer Open Systems Interconnection (OSI) architecture according to various embodiments of the present application.

Referring to FIG. 3A, architecture 300 is provided. Architecture 300 can be implemented in connection with process 200 of FIG. 2, process 900 of FIG. 9, process 1000 of FIG. 10, and/or process 1100 of FIG. 11. Architecture 300 can be implemented in connection with special request frame 400 of FIG. 4A, special response frame 450 of FIG. 4B, special request frame 500 of FIG. 5A, special response frame 550 of FIG. 5B, special request frame 600 of FIG. 6A, special response frame 650 of FIG. 6B, special request frame 700 of FIG. 7A, special response frame 750 of FIG. 7B, special request frame 800 of FIG. 8A, special request frame 825 of FIG. 8B, special response frame 850 of FIG. 8C, and/or special response frame 875 of FIG. 8D. Architecture 300 can be implemented at least in part by computer system 1200 of FIG. 12.

As illustrated in FIG. 3A, architecture 300 comprises a physical layer, a data link layer, a presentation layer (e.g., that can include a service acquisition or discovery layer), and an application layer.

FIG. 3B is a diagram of a seven-layer OSI architecture according to related art.

As illustrated in FIG. 3B, architecture 350 according to a seven-layer OSI architecture is provided. Architecture 350 comprises an application layer, a presentation layer, a session layer, a transport layer, a network layer, a data link layer, and a physical layer.

As illustrated in contrasting architecture 300 with architecture 350, according to various embodiments, architecture 300 comprises a service discovery acquisition layer. The service discovery acquisition layer of architecture 300 can perform the functions of the session layer, the transport layer, and the network layer of architecture 350.

According to various embodiments, remote service request information is included in an extensible field in a special request frame. The special request frame is used in connection with (e.g., for) terminal-access point mutual discovery. As an example, the special request frame is a probe frame and an authentication frame in WiFi protocol. Discovery can use a probe frame and a service request can use the authentication frame. As another example, the special request frame is a special frame for discovery in Bluetooth protocol. In response to adding the remote service request information, the special request frame is communicated. Various embodiments can be equivalent to establishing a service discovery acquisition mechanism or a service discovery acquisition layer between the representation layer and the data link layer.

Referring to FIG. 2, process 200 can be implemented by a terminal. For example, process 200 can be implemented by a terminal in connection with terminal communicating remote service request information to an access point such as access point 120 of system 100 of FIG. 1.

At 210, remote service request information can be included in an extensible field in a special request frame. The special request frame can be used for terminal-access point mutual discovery. The remote service request information can correspond to a service that is desired by the terminal. The remote service request information can indicate a service being requested. For example, the remote service request information comprises an identifier associated with the remote service. As another example, the remote service request information comprises an identifier associated with a server that provides the remote service (e.g., a server corresponding to the remote service).

At 220, the special request frame is communicated to an access point. In some embodiments, the access point determines a server to which to send the remote service request information based at least in part on the identifier associated with the remote service. For example, the access point can query a mapping of remote service identifiers to servers. As another example, the remote service request information comprises an address (e.g., an IP address or domain information) of a server corresponding to the remote server.

According to various embodiments, the remote service associated with the remote service request information is a service provided by a server via a network communication. For example, the remote service can generally be any type of service. The service can be a public information service including a GPS information service, a weather information service, an emergency alert service, a news service, etc. In some embodiments, the remote service is a subscription service, including a media service (e.g., Netflix®, Pandora®, etc.), a banking service, a dating service, a gaming service, a shopping service, etc. In some embodiments, the remote service is a location-based service including a shopping service, a news service, a mapping service, etc.

In some embodiments, process 200 is invoked in response to determining that the terminal cannot establish a communication connection with a remote server. For example, process 200 is invoked in response to determining that the terminal is unable to communicate (e.g., establish a communication connection with a remote service) due to resource constraints. According to various embodiments, in response to determining that the terminal is to obtain a remote service, the terminal determines that it is unable to establish a communication connection with the remote server, and in response to determining that the terminal is unable to establish the connection with the server (e.g., as a result of one or more resource constraints), the terminal performs process 200.

In some embodiments, before requesting a remote service, the terminal determines whether the terminal is able to establish a communication connection with the remote server.

In some embodiments, before requesting a remote service, the terminal determines a status of the terminal with respect to one or more resource constraints. For example, the terminal determines a status of the terminal and determines whether the terminal has a resource constraint status (e.g., determines whether the terminal satisfies one or more conditions with respect to the resource constraint). For example, the terminal determines whether the power of the terminal (e.g., an amount of battery remaining) is sufficient or determines whether the current network connection status of the terminal is normal. In some embodiments, the terminal attempts to establish a normal communication connection with the AP (e.g., in connection with determining whether the terminal has a constraint status). If the terminal fails to establish the normal communication connection with the AP, the terminal determines that the terminal has resource constraint status and is unable to establish a communication connection with the server.

According to various embodiments, the determining the special request frame comprises encoding a remote service request to form remote server request information. The determining the special request frame can comprise adding the remote service request information to the extensible field.

The remote service request can be encoded because of restrictions with respect to the special request frame. For example, in some embodiments, the extensible field of the special request frame can only comprise code because the extensible field has limited capacity. Accordingly, the remote service request is to be converted into code and included in the extensible field. Various encoding processes can be implemented. For example, the encoding of the remote service request comprises using a preset encoding rule approach. As another example, the encoding of the remote service request comprises using a codebook look-up approach. As an example of encoding using a codebook look-up approach, "3A4C" corresponds to "Dec. 31, 2015" in the code book. Therefore, the encoded remote service request information is "3A4C." As another example of encoding using a codebook look-up approach, if "58B1" corresponds to "Beijing" in the code book, the encoded remote service request information (e.g., pertaining to a request with respect to "Beijing") is "58B1." Different remote service request information can have different corresponding codes. The codebook can store a mapping of information to codes (e.g., a mapping of alphanumeric strings to codes).

According to various embodiments, a special request frame is always used in connection with the connection between a terminal and an access point. For example, various communication protocols (e.g., WiFi, Bluetooth, etc.) comprise a special request frame. According to various embodiments, the special request frame is used for terminal-access point mutual discovery. As an example with respect to the WiFi protocol, the special request frame corresponds to the probe frame and authentication frame mechanism. As an example with respect to the Bluetooth protocol, the special request frame corresponds to the special discovery frame mechanism in Bluetooth protocol. In some embodiments, a special request frame is always present in communications between the terminal and the access point, or between the terminal and the server. The special request frame can always be present regardless of whether the terminal is in communication with the server. The special request frame mechanism can be a data link layer/physical layer mechanism. The mutual discovery mechanism is a mechanism that enables a terminal to promptly discover and re-establish normal communications when a network connection is restored (e.g., the mechanism enables a terminal to re-connect to a network). According to various embodiments, the terminal can only promptly discover and re-establish normal communications when a network connection is restored if the mutual discovery mechanism is enabled (e.g., is present in the communication protocol of the terminal with the network device such as the access point). The communication protocols that support the mutual discovery mechanisms generally specify that the corresponding frames (e.g., the probe frame and authentication frame for WiFi protocol, the special discovery frame for Bluetooth protocol, etc.) are generally variable-length frames. The frame has one or more extensible fields, and information can be added to the extensible fields in accordance with future requirements or specifications. According to various embodiments, remote service request information is added to extensible fields in frames generally used for mutual discovery mechanisms of various communication protocols.

As an example pertaining to a default remote service requested by a terminal corresponding to a remote weather service, if the terminal wants to request remote weather service (e.g., if wants to request to view the weather on Dec. 31, 2015), the terminal issues a request to view the weather on Dec. 31, 2015. Accordingly, the information pertaining to the remote service request is encoded. The encoding for the service can correspond to a decoding used by access point application decode, so both of the terminal and the access point can understand the communication, such as the service url, service://servcie_name?paramlist. If the terminal wants to obtain a weather service corresponding to weather on Dec. 31, 2015 in Beijing, the information pertaining to such request and the remote service request information after encoding corresponds to "3A4C 58B1." In response to encoding the remote service request information, the corresponding encoded remote service request information (e.g., "3A4C 58B1") is added to the extensible field. The encoding of a remote service request and populating the extensible field with remote service request information is further discussed with respect to FIG. 4A.

Figure 4A:
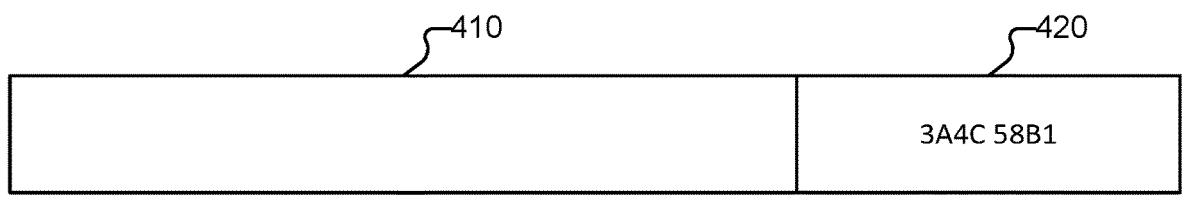
FIG. 4A is a diagram of remote service request information added to an extensible field of a special request frame according to various embodiments of the present application.

FIG. 4A is a diagram of remote service request information added to an extensible field of a special request frame according to various embodiments of the present application.

Referring to FIG. 4A, special request frame 400 is provided. Special request frame 400 can be implemented in connection with process 200 of FIG. 2, process 900 of FIG. 9, process 1000 of FIG. 10, and/or process 1100 of FIG. 11. Special request frame 400 can be implemented in connection with architecture 300 of FIG. 3A, and/or special response frame 450 of FIG. 4B. Special request frame 400 can be implemented at least in part by computer system 1200 of FIG. 12.

As illustrated in FIG. 4A, special request frame 400 comprises field 410 and extensible frame 420. Field 410 can correspond to one or more fields or frames that are used by communication protocols to support the mutual discovery mechanisms, such as data content. In some embodiments, special request frame 400 corresponds to a probe frame and authentication frame for WiFi protocol, and field 410 comprises the one or more fields or frames that comprise information used in connection with the mutual discovery. In some embodiments, special request frame 400 corresponds to the special discovery frame for Bluetooth protocol, and field 410 comprises the one or more fields or frames that comprise information used in connection with the mutual discovery. Extensible frame 420 can correspond to a frame that is included in the special request frame used to support the mutual discovery mechanism but that is otherwise generally empty or set with an invalid value (e.g., to separate the frame from other normal frames). If the terminal wants to obtain a weather service corresponding to weather on Dec. 31, 2015 in Beijing, and the terminal determines that the information "Dec. 31, 2015" corresponds to "3A4C" and the information "Beijing" corresponds to "58B1," then the information pertaining to such request and the remote service request information after encoding corresponds to "3A4C 58B1." In response to encoding the remote service request information, the corresponding encoded remote service request information (e.g., "3A4C 58B1") is added to extensible frame 420. In some embodiments, a single remote service is provided. As an example, if a single remote service is provided, only information pertaining to the requested information for such service is included in the extensible frame. The extensible field can comprise the string or information used to query a specific remote service.

Figure 4B:
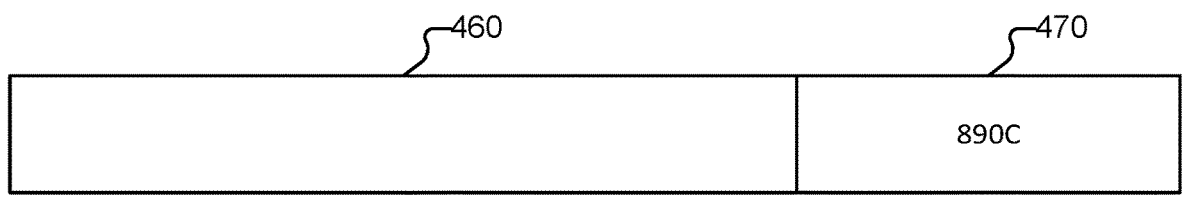
FIG. 4B is a diagram of remote service response information fetched from an extensible field of a special response frame according to various embodiments of the present application.

FIG. 4B is a diagram of remote service response information fetched from an extensible field of a special response frame according to various embodiments of the present application.

Referring to FIG. 4B, special response frame 450 is provided. Special response frame 450 can be implemented in connection with process 200 of FIG. 2, process 900 of FIG. 9, process 1000 of FIG. 10, and/or process 1100 of FIG. 11. Special response frame 450 can be implemented in connection with architecture 300 of FIG. 3A, and/or special request frame 400 of FIG. 4A. Special response frame 450 can be implemented at least in part by computer system 1200 of FIG. 12.

In response to the request for the remote service associated with the special request frame (e.g., special request frame 400), the server can determine a response to the remote service request. The server communicates the response to the remote service request. According to various embodiments, the response to the remote service request is included in an extensible field of a special response frame.

According to various embodiments, the special response frame is always used in connection with the connection between a terminal and an access point. For example, various communication protocols (e.g., WiFi, Bluetooth, etc.) comprise a special response frame. According to various embodiments, the special response frame is used for terminal-access point mutual discovery. As an example with respect to the WiFi protocol, the special response frame corresponds to the probe frame and authentication frame mechanism. As an example with respect to the Bluetooth protocol, the special response frame corresponds to the special discovery frame mechanism in Bluetooth protocol.

In some embodiments, special response frame 450 corresponds to the probe frame and authentication frame for WiFi protocol, and field 460 comprises the one or more fields or frames that comprise information (e.g., data content) used in connection with the mutual discovery. In some embodiments, special response frame 450 corresponds to the special discovery frame for Bluetooth protocol, and field 460 comprises the one or more fields or frames that comprise information used in connection with the mutual discovery. Extensible frame 470 can correspond to a frame that is included in the special request frame used to support the mutual discovery mechanism but that is otherwise generally empty.

According to various embodiments, the special response frame is created in response to the special request frame. For example, the special request frame corresponds to a frame communicated from the terminal in connection with a mutual discovery mechanism, and the special response frame corresponds to a frame communicated to the terminal (e.g., received by the terminal) in connection with the mutual discovery mechanism.

Using the example provided in connection with special request frame 400 of FIG. 4A, if the server determines that a response to the request for remote service is "890C," the response is included in extensible field 470 of the special response frame 450. The value "890C" can correspond to a value mapped to a response. For example, the value "890C" can be a result of an encoding of the response to the request for the remote service. The value "890C" can correspond to a result to the query pertaining to query (or request) parameters "3A4C 58B1" (e.g., associated with the query Dec. 31, 2015 and Beijing), such as "clear." The response value to be included in the extensible field 470 of special response frame 450 can be determined based at least in part on a code book, one or more preset encoding rules (e.g., an encoding process), etc. The response value can be based on data that is obtained from a remote web server (e.g., http://weatheronline.com).

According to various embodiments, the extensible field of a special request frame has a predefined format or syntax. For example, the extensible field comprises an indication of a requested remote service and a corresponding requested remote service content. The extensible field can be generated (e.g., populated) according to one or more predefined rules or processes. For example, an order of the indication of a requested remote service and a corresponding requested remote service content can be predefined. As another example, a predefined set of bits of the extensible frame can be allocated (e.g., used) for the indication of a requested remote service, and a predefined set of bits of the extensible frame can be allocated (e.g., used) for corresponding requested remote service content.

Figure 5A:
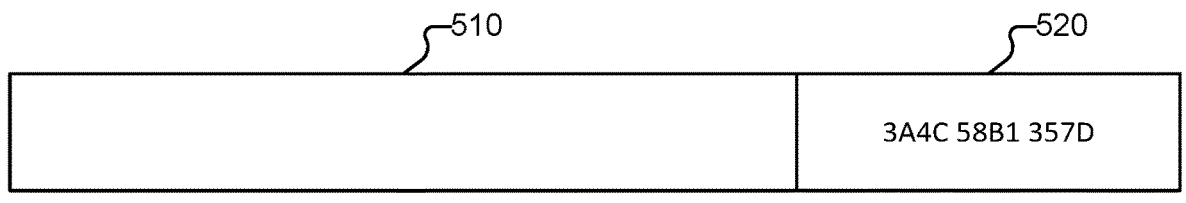
FIG. 5A is a diagram of a requested remote service type and requested remote service content added to an extensible field of a special request frame according to various embodiments of the present application.

FIG. 5A is a diagram of a requested remote service type and requested remote service content added to an extensible field of a special request frame according to various embodiments of the present application.

Referring to FIG. 5A, special request frame 500 is provided. Special request frame 500 can be implemented in connection with process 200 of FIG. 2, process 900 of FIG. 9, process 1000 of FIG. 10, and/or process 1100 of FIG. 11. Special request frame 500 can be implemented in connection with architecture 300 of FIG. 3A and/or special response frame 550 of FIG. 5B. Special request frame 500 can be implemented at least in part by computer system 1200 of FIG. 12.

In some embodiments, the remote service requested by a terminal (e.g., using the special request frame) is a specific remote service. In some embodiments, multiple remote services are requested. For example, the terminal requests multiple remote services using a single special request frame. In some embodiments, the terminal includes a requested service in the special request frame. For example, an identifier associated with a requested service (e.g., a specific remote service) is included in the special request frame (e.g., the extensible frame). According to various embodiments, remote service request information includes the requested remote service type and the requested remote service content. The requested remote service type is mapped to one or more services. In some embodiments, the requested remote service type corresponds to an identifier associated with one or more services. The requested remote service content can correspond to requested information associated with the requested remote service type. For example, the requested remote service content can correspond to one or more parameters associated with the requested remote service type. In some embodiments, the requested remote service content corresponds to one or more query parameters to be used in connection with obtaining the requested remote service (e.g., the server can use the requested remote service content to perform a query with respect to the requested remote service).

According to various embodiments, a remote service request includes the requested remote service type and requested remote service content, and the requested remote service can be indicated in the extensible field of the special request frame. For example, the extensible frame comprising the remote service request information further comprises an indication of the requested remote service. The indication of the requested remote service can correspond to the identifier associated with one or more requested services. In some embodiments, the requested remote service type and requested remote service content are comprised in the same extensible field of the same special request frame.

For example, if a request is made to view the weather in Beijing on Dec. 31, 2015, and the code (e.g., the resulting encoded value) for "weather" is "357D" and the code (e.g., the resulting encoded value) for "Dec. 31, 2015 Beijing" is "3A4C 58B1," then the requested remote service type is "357D," and the requested remote service content is "3A4C 58B1." As illustrated in FIG. 5A, the special request frame 500 can comprise an extensible field 520 comprising the requested remote service type (e.g., "357D") and the requested remote service content (e.g., "3A4C 58B1").

Special request frame 500 comprises field 510 and extensible frame 520. Field 510 can correspond to one or more fields or frames that are used by communication protocols to support the mutual discovery mechanisms. In some embodiments, special request frame 500 corresponds to a probe frame and authentication frame for WiFi protocol, and field 510 comprises the one or more fields or frames that comprise information (e.g., data content) used in connection with the mutual discovery. In some embodiments, special request frame 500 corresponds to the special discovery frame for Bluetooth protocol, and field 510 comprises the one or more fields or frames that comprise information used in connection with the mutual discovery. Extensible frame 520 can correspond to a frame that is included in the special request frame used to support the mutual discovery mechanism but that is otherwise generally empty.

Figure 5B:
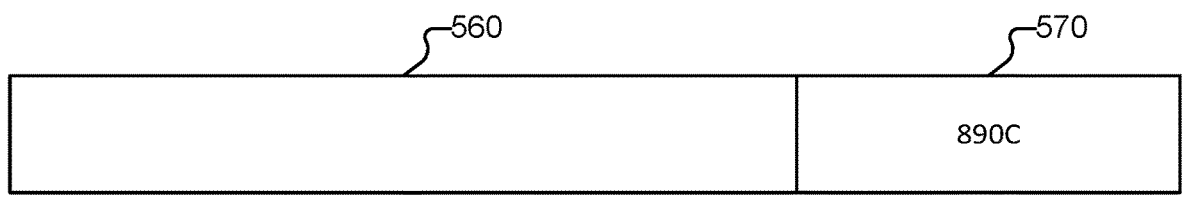
FIG. 5B is a diagram of a response as to whether the remote service type is obtainable and the actually obtained remote service according to various embodiments of the present application.

FIG. 5B is a diagram of a response as to whether the remote service type is obtainable and the actually obtained remote service according to various embodiments of the present application.

Referring to FIG. 5B, special response frame 550 is provided. Special response frame 550 can be implemented in connection with process 200 of FIG. 2, process 900 of FIG. 9, process 1000 of FIG. 10, and/or process 1100 of FIG. 11. Special response frame 550 can be implemented in connection with architecture 300 of FIG. 3A and/or special request frame 500 of FIG. 5A. Special response frame 550 can be implemented at least in part by computer system 1200 of FIG. 12.

In response to a request for the remote service associated with the special request frame (e.g., special request frame 500), the server can determine a response to the remote service request. The server communicates the response to the remote service request. According to various embodiments, the response to the remote service request is included in an extensible field of a special response frame.

In some embodiments, special response frame 550 corresponds to a probe frame and authentication frame for WiFi protocol, and field 560 comprises the one or more fields or frames that comprise information (e.g., data content) used in connection with the mutual discovery. In some embodiments, special response frame 550 corresponds to the special discovery frame for Bluetooth protocol, and field 560 comprises the one or more fields or frames that comprise information used in connection with the mutual discovery. Extensible frame 570 can correspond to a frame that is included in the special request frame used to support the mutual discovery mechanism but that is otherwise generally empty.

According to various embodiments, the special response frame corresponds to the special request frame. For example, the special request frame corresponds to a frame communicated from the terminal in connection with a mutual discovery mechanism, and the special response frame corresponds to a frame communicated to the terminal (e.g., received by the terminal) in connection with the mutual discovery mechanism.

Using the example provided in connection with special request frame 500 of FIG. 5A, if the server determines that a response to the request for remote service is "890C," the response is included in extensible field 570 of the special response frame 550. The value "890C" can correspond to a value mapped to a response. For example, the value "890C" can be a result of an encoding of the response to the request for the remote service. The value "890C" can correspond to a result to the query pertaining to query (or request) parameters "3A4C 58B1" (e.g., associated with the query Dec. 31, 2015 and Beijing) for a remote service corresponding to requested remote service type mapped to value "357D." The response value to be included in the extensible field 570 of special response frame 550 can be determined based at least in part on a code book, one or more preset encoding rules (e.g., an encoding process), etc.

According to various embodiments, the requested remote service type and the requested remote service content are both added according to designated positions to the same extensible field in the same special request frame. As illustrated in FIG. 5A, the code "357D" for "weather" and the code "3A4C 58B1" for "Dec. 31, 2015 Beijing" are simultaneously added to extensible field 520 of special request frame 500, and the last 4 digits of the extensible field represent the requested remote service type.

Figure 6A:
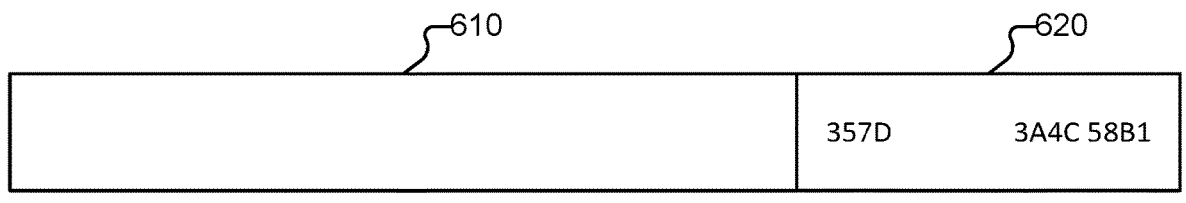
FIG. 6A is a diagram of a requested remote service type and requested remote service content added to an extensible field of a special request frame according to various embodiments of the present application.

FIG. 6A is a diagram of a requested remote service type and requested remote service content added to an extensible field of a special request frame according to various embodiments of the present application.

Referring to FIG. 6A, special request frame 600 is provided. Special request frame 600 can be implemented in connection with process 200 of FIG. 2, process 900 of FIG. 9, process 1000 of FIG. 10, and/or process 1100 of FIG. 11. Special request frame 600 can be implemented in connection with architecture 300 of FIG. 3A and/or special response frame 650 of FIG. 6B. Special request frame 600 can be implemented at least in part by computer system 1200 of FIG. 12.

Special request frame 600 comprises field 610 and extensible frame 620. Field 610 can correspond to one or more fields or frames (e.g., data content) that are used by communication protocols to support the mutual discovery mechanisms.

As illustrated in FIG. 6A, the requested remote service type can be added at the first four places (e.g., digits) of the extensible field 620 of the special request frame 600.

According to various embodiments, the requested remote service type and the requested remote service content are added to the same extensible field in the same special request frame according to one or more predefined rules. The one or more predefined rules can set designated positions of the extensible frame that correspond respectively to the requested remote service type and the requested remote service content. The remote service type and the remote service content can be identified by their different positions within the extensible field.

According to various embodiments, the one or more predefined rules according to which the extensible field is generated (e.g., populated with the requested remote service type and the requested remote service content) are based at least in part on a communication protocol of the terminal, the access point, the server, or a combination thereof. The one or more predefined rules according to which the extensible field is generated are preset by an administrator. The one or more predefined rules according to which the extensible field is generated are set according to network or communication settings.

Figure 6B:
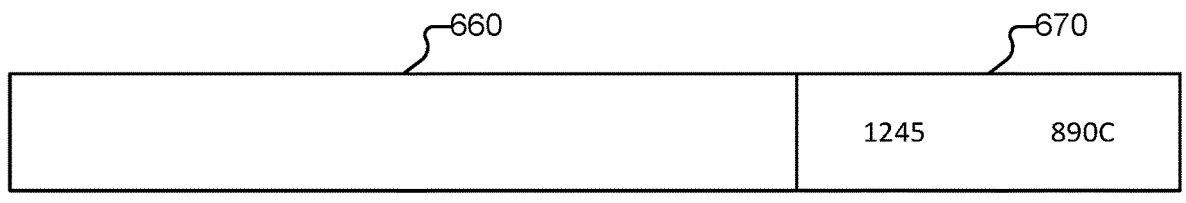
FIG. 6B is a diagram of a response as to whether the remote service type is obtainable and the obtained remote service according to various embodiments of the present application.

FIG. 6B is a diagram of a response as to whether the remote service type is obtainable and the obtained remote service according to various embodiments of the present application.

Referring to FIG. 6B, special response frame 650 is provided. Special response frame 650 can be implemented in connection with process 200 of FIG. 2, process 900 of FIG. 9, process 1000 of FIG. 10, and/or process 1100 of FIG. 11. Special response frame 650 can be implemented in connection with architecture 300 of FIG. 3A and/or special request frame 600 of FIG. 6A. Special response frame 650 can be implemented at least in part by computer system 1200 of FIG. 12.

Special response frame 650 comprises field 660 and extensible frame 670. Field 650 can correspond to one or more fields or frames (e.g., data content) that are used by communication protocols to support the mutual discovery mechanisms.

In response to a request for the remote service associated with the special request frame (e.g., special request frame 600), the server can determine a response to the remote service request. The server communicates the response to the remote service request. According to various embodiments, the response to the remote service request is included in an extensible field of a special response frame.

Using the example provided in connection with special request frame 600 of FIG. 6A, if the server determines that a response to the request for remote service is "890C," the response is included in extensible field 670 of the special response frame 650. The value "890C" can correspond to a value mapped to a response. For example, the value "890C" can be a result of an encoding of the response to the request for the remote service. The value "890C" can correspond to a result to the query pertaining to query (or request) parameters "3A4C 58B1" (e.g., associated with the query Dec. 31, 2015 and Beijing) for a remote service corresponding to requested remote service type mapped to value "357D" (e.g., included in the special request frame 600). The response value to be included in the extensible field 670 of special response frame 650 can be determined based at least in part on a code book, one or more preset encoding rules (e.g., an encoding process), etc.

In addition to the value "890C" corresponding to a response to the requested remote service, the extensible field 670 of special response frame 650 can comprise another value (e.g., "1245" such as a value indicating that the service is available or obtainable) associated with the requested remote service. For example, the other value is associated with a status of the remote service (e.g., as distinct from the value "890C" that can be responsive to the query comprised in the special request frame).

Figure 7A:
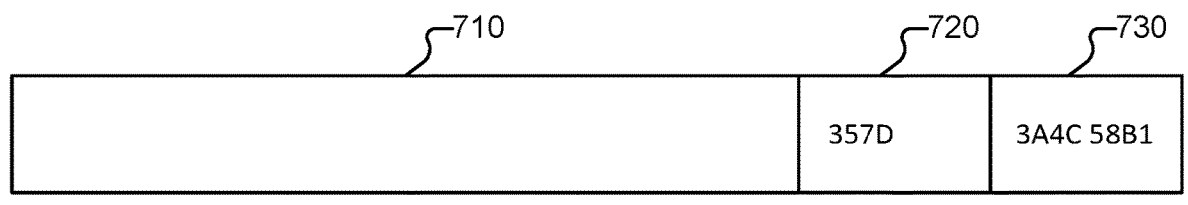
FIG. 7A is a diagram of an encoded requested remote service type and requested remote service content added to a special request frame according to various embodiments of the present application.

FIG. 7A is a diagram of an encoded requested remote service type and requested remote service content added to a special request frame according to various embodiments of the present application.

Referring to FIG. 7A, special request frame 700 is provided. Special request frame 700 can be implemented in connection with process 200 of FIG. 2, process 900 of FIG. 9, process 1000 of FIG. 10, and/or process 1100 of FIG. 11. Special request frame 700 can be implemented in connection with architecture 300 of FIG. 3A and/or special response frame 750 of FIG. 7B. Special request frame 700 can be implemented at least in part by computer system 1200 of FIG. 12.

According to various embodiments, a remote service request includes an indication of the requested remote service (e.g., a requested remote service type) and requested remote service content (e.g., one or more parameters associated with the remote service). In some embodiments, the indication of the requested remote service and the requested remote service content are comprised in one or more extensible fields of the special request frame. The indication of the requested remote service and the requested remote service content can be comprised in different extensible fields of the same special request frame. For example, a special request frame comprises a first extensible field and a second extensible field, and the first extensible field comprises the indication of the requested remote service, and the second extensible field comprises the requested remote service content. The requested remote service type and the requested remote service content can be encoded to different extensible fields in the same special request frame.

Special request frame 700 comprises field 710, extensible frame 720, and extensible frame 730. Field 710 can correspond to one or more fields or frames that are used by communication protocols to support the mutual discovery mechanisms. In some embodiments, special request frame 700 corresponds to a probe frame and authentication frame for WiFi protocol, and field 710 comprises the one or more fields or frames that comprise information used in connection with the mutual discovery. In some embodiments, special request frame 700 corresponds to the special discovery frame for Bluetooth protocol, and field 710 comprises the one or more fields or frames that comprise information used in connection with the mutual discovery. Extensible frame 710 and extensible frame 720 can correspond to frames that are included in the special request frame used to support the mutual discovery mechanism but that is otherwise generally empty.

As illustrated in FIG. 7A, code "357D" corresponding to "weather" (e.g., corresponding to a remote service type) is added to extensible field 720 in special request frame 700, and code "3A4C 58B1" corresponding to "Dec. 31, 2015 Beijing" is added to extensible field 730 in special request frame 700. According to various embodiments, the extensible field 720 and extensible field 730 are generated (e.g., populated) contemporaneously. The value for extensible field 720 can be encoded in connection with the encoding of the value for extensible field 730. For example, "weather" code "357D" is added to extensible field 720 and the "Dec. 31, 2015 Beijing" code "3A4C 58B1" is added to extensible field 730 simultaneously.

In some embodiments, the indication of the requested remote service (e.g., a requested remote service type) and the requested remote service content are communicated in different special request frames. For example, the "weather" code "357D" is added to extensible field 720 and extensible frame 730 of the special request frame is a blank field (e.g., has a null value or another predefined value), and after the corresponding response message is received, the "Dec. 31, 2015 Beijing" code "3A4C 58B1" is added to extensible field 730 of a different special request frame 700 in which extensible field 720 is a blank field (e.g., has a null value or another predefined value). The special request frame 700 can include the value(s) corresponding "Dec. 31, 2015 Beijing" in connection with a query to the weather service for weather information in Beijing on Dec. 31, 2015. The terminal can then obtain a response (e.g., a special response frame) corresponding to the special request frame comprising the information in extensible frame 730.

Figure 7B:
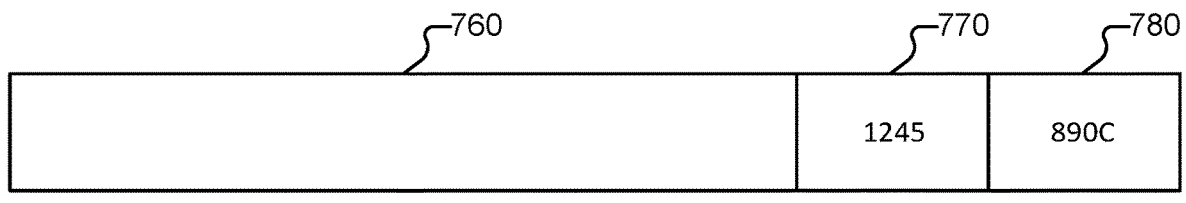
FIG. 7B is a diagram of a response as to whether a remote service type is obtainable and an obtained remote service according to various embodiments of the present application.

FIG. 7B is a diagram of a response as to whether a remote service type is obtainable and an obtained remote service according to various embodiments of the present application.

Referring to FIG. 7B, special response frame 750 is provided. Special response frame 750 can be implemented in connection with process 200 of FIG. 2, process 900 of FIG. 9, process 1000 of FIG. 10, and/or process 1100 of FIG. 11. Special response frame 750 can be implemented in connection with architecture 300 of FIG. 3A and/or special request frame 700 of FIG. 7A. Special response frame 750 can be implemented at least in part by computer system 1200 of FIG. 12.

Special response frame 750 comprises field 760, extensible frame 770, and extensible frame 780. Field 760 can correspond to one or more fields or frames that are used by communication protocols to support the mutual discovery mechanisms. In some embodiments, special response frame 750 corresponds to a probe frame and authentication frame for WiFi protocol, and field 760 comprises the one or more fields or frames that comprise information used in connection with the mutual discovery. In some embodiments, special response frame 750 corresponds to the special discovery frame for Bluetooth protocol, and field 760 comprises the one or more fields or frames that comprise information used in connection with the mutual discovery. Extensible frame 770 and extensible frame 780 can correspond to frames that are included in the special request frame used to support the mutual discovery mechanism but that is otherwise generally empty.

In response to a request for the remote service associated with the special request frame (e.g., special request frame 700), the server can determine a response to the remote service request. The server communicates the response to the remote service request. According to various embodiments, the response to the remote service request is included in an extensible field of a special response frame.

Using the example provided in connection with special request frame 700 of FIG. 7A, if the server determines that a response to the request for remote service is "890C" (e.g., which can correspond to a value mapped to a weather condition such as cloudy, rainy, sunny, etc.), the response is included in extensible field 780 of the special response frame 750. The value "890C" can correspond to a value mapped to a response. For example, the value "890C" can be a result of an encoding of the response to the request for the remote service. The value "890C" can correspond to a result to the query pertaining to query (or request) parameters "3A4C 58B1" (e.g., associated with the query Dec. 31, 2015 and Beijing) for a remote service corresponding to requested remote service type mapped to value "357D." The response value to be included in the extensible field 780 of special response frame 750 can be determined based at least in part on a code book, one or more preset encoding rules (e.g., an encoding process), etc.

In addition to the value "890C" corresponding to a response to the requested remote service, special response frame 750 can comprise another value (e.g., "1245") associated with the requested remote service. The other value (e.g., "1245") associated with the requested remote service can be comprised in extensible field 770 of special response frame 750. For example, the other value is associated with a status of the remote service (e.g., as distinct from the value "890C" that can be responsive to the query comprised in the special request frame).

Figure 8A:
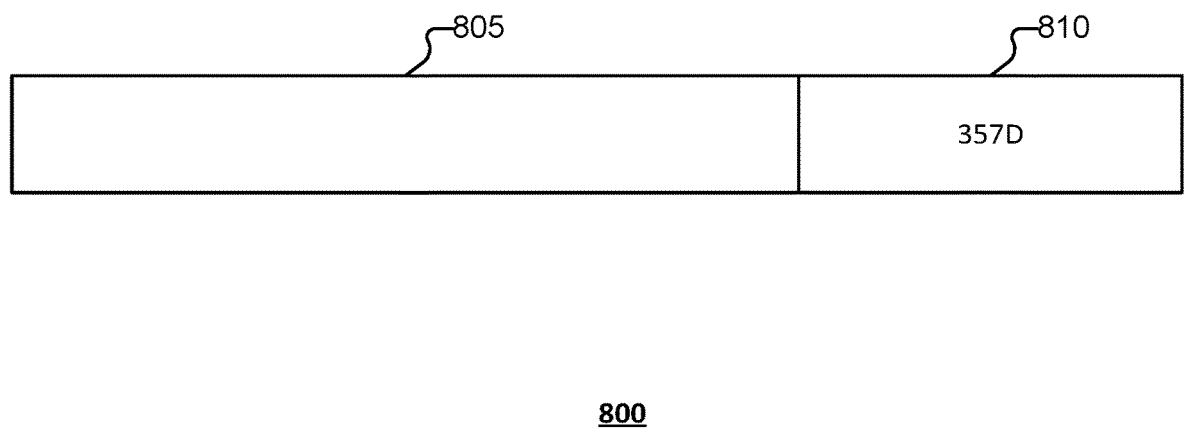
FIGS. 8A and 8B are diagrams of requested remote service type and requested remote service content added to respective extensible fields in different special request frames according to various embodiments of the present application.
Figure 8B:
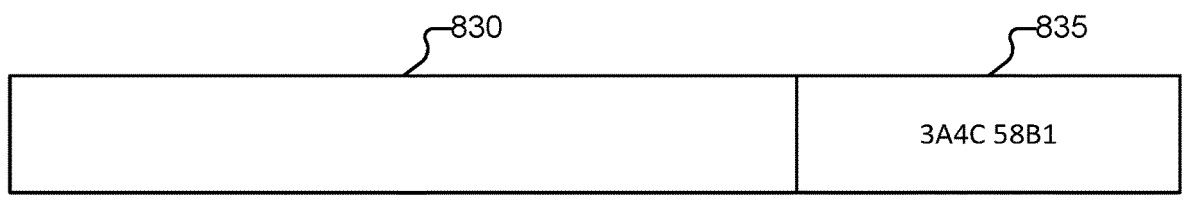

FIGS. 8A and 8B are diagrams of requested remote service type and requested remote service content added to respective extensible fields in different special request frames according to various embodiments of the present application.

Referring to FIGS. 8A and 8B, special request frame 800 and special request frame 825 are provided. Special request frame 800 and special request frame 825 can be implemented in connection with process 200 of FIG. 2, process 900 of FIG. 9, process 1000 of FIG. 10, and/or process 1100 of FIG. 11. Special request frame 800 and special request frame 825 can be implemented in connection with architecture 300 of FIG. 3A, and/or special response frame 850 of FIG. 8C and special response frame 875 of FIG. 8D. Special request frame 800 and special request frame 825 can be implemented at least in part by computer system 1200 of FIG. 12.

According to various embodiments, a remote service request includes an indication of the requested remote service (e.g., a requested remote service type) and requested remote service content (e.g., one or more parameters associated with the remote service). In some embodiments, the indication of the requested remote service and the requested remote service content are comprised in one or more extensible fields of the special request frame. In some embodiments, the indication of the requested remote service and the requested remote service content are comprised in extensible fields respectively comprised in different special request frames. For example, a first special request frame comprises an extensible field including the indication of the requested remote service, and a second special request frame comprises an extensible field including the requested remote service.

As illustrated in FIG. 8A, special request frame 800 comprises field 805 and extensible frame 810. Field 805 can correspond to one or more fields or frames that are used by communication protocols to support the mutual discovery mechanisms. Extensible frame 810 can correspond to a frame that is included in the special request frame used to support the mutual discovery mechanism but that is otherwise generally empty.

In some embodiments, the remote service requested by a terminal (e.g., using the special request frame) is a specific remote service. In some embodiments, multiple remote services are requested. For example, the terminal requests multiple remote services using a single special request frame. In some embodiments, the terminal includes a requested service in the special request frame. For example, an identifier associated with a requested service (e.g., a specific remote service) is included in the special request frame (e.g., the extensible frame). According to various embodiments, remote service request information includes the requested remote service type and the requested remote service content. The requested remote service type is mapped to one or more services. In some embodiments, the requested remote service type corresponds to an identifier associated with one or more services. The requested remote service content can correspond to requested information associated with the requested remote service type. For example, the requested remote service content can correspond to one or more parameters associated with the requested remote service type. In some embodiments, the requested remote service content corresponds to one or more query parameters to be used in connection with obtaining the requested remote service (e.g., the server can use the requested remote service content to perform a query with respect to the requested remote service).

According to various embodiments, a remote service request includes a requested remote service type and requested remote service content, and the requested remote service can be indicated in the extensible field of the special request frame. For example, the extensible frame comprising the remote service request information further comprises an indication of the requested remote service. The indication of the requested remote service can correspond to the identifier associated with one or more requested services. In some embodiments, the requested remote service type and requested remote service content are comprised in the same extensible field of the same special request frame.

If the terminal wants to obtain a weather service (e.g., the requested remote service) corresponding to weather on Dec. 31, 2015 in Beijing (e.g., the one or more parameters for the requested remote service), and the terminal determines that the weather service corresponds to information "357D," the information "Dec. 31, 2015" corresponds to "3A4C," and the information "Beijing" corresponds to "58B1," then the information pertaining to such request and the remote service request information after encoding corresponds to "357D" and "3A4C 58B1."

As illustrated in FIGS. 8A and 8B, the special request frame 800 can comprise an extensible field 810 comprising the requested remote service type (e.g., "357D"), and the special request frame 825 can comprise an extensible field 835 comprising the requested remote service content is (e.g., "3A4C 58B1"). Special request frame 825 comprises field 830 and extensible frame 835. Field 830 can correspond to one or more fields or frames that are used by communication protocols to support the mutual discovery mechanisms. Extensible frame 835 can correspond to a frame that is included in the special request frame used to support the mutual discovery mechanism but that is otherwise generally empty. In response to encoding the requested remote service type, the corresponding encoded requested remote service type (e.g., "357D") is added to extensible field 810. In response to encoding the remote service request information, the corresponding encoded remote service request information (e.g., "3A4C 58B1") is added to extensible field 835. Special request frame 800 and special request frame 850 can be communicated contemporaneously. For example, the terminal can communicate the special request frame 800 and special request frame 850 in connection with the request for a weather service corresponding to weather on Dec. 31, 2015 in Beijing.

Figure 8C:
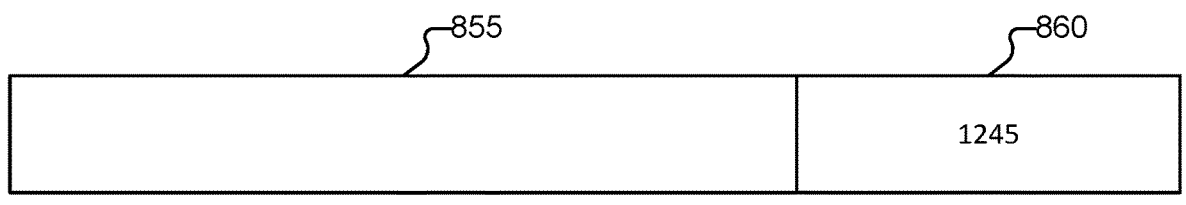
FIGS. 8C and 8D are diagrams of an encoded response as to whether the remote service type is obtainable and the encoded obtained remote service according to various embodiments of the present application.
Figure 8D:
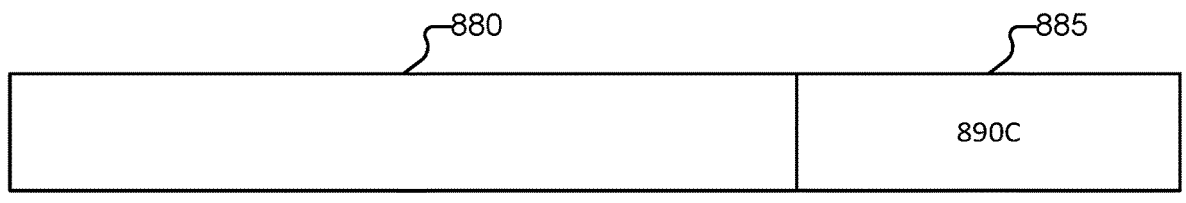

FIGS. 8C and 8D are diagrams of an encoded response as to whether the remote service type is obtainable and the encoded obtained remote service according to various embodiments of the present application.

Referring to FIGS. 8C and 8D, special response frame 850 and special response frame 875 are provided. Special response frame 850 and special response frame 875 can be implemented in connection with process 200 of FIG. 2, process 900 of FIG. 9, process 1000 of FIG. 10, and/or process 1100 of FIG. 11. Special response frame 850 and special response frame 875 can be implemented in connection with architecture 300 of FIG. 3A, and/or special request frame 800 of FIG. 8A and special request frame 825 of FIG. 8B. Special response frame 850 and special response frame 875 can be implemented at least in part by computer system 1200 of FIG. 12.

Special response frame 850 and special response frame 875 can be implemented by a server or an access point (e.g., in response to obtaining the corresponding remote service information from the server).

Special response frame 850 comprises field 855 and extensible frame 860, and special response frame 875 comprises field 880 and extensible frame 885. Fields 855 and 880 can correspond to one or more fields or frames that are used by communication protocols to support the mutual discovery mechanisms. In some embodiments, special response frame 850 and special response frame 875 respectively correspond to probe frame and authentication frame for WiFi protocol, and field 855 and field 880 respectively comprise the one or more fields or frames that comprise information used in connection with the mutual discovery. In some embodiments, special response frame 850 and special response frame 875 respectively correspond to the special discovery frame for Bluetooth protocol, and field 855 and field 880 respectively comprise the one or more fields or frames that comprise information used in connection with the mutual discovery. Extensible frame 860 and extensible frame 885 can correspond to frames that are included in the special request frame used to support the mutual discovery mechanism but that is otherwise generally empty.

In response to a request for the remote service associated with the special request frame (e.g., special request frame 800 and special request frame 825), the server can determine a response to the remote service request and/or additional information associated with the requested server. The server communicates one or more responses to the remote service request. According to various embodiments, the response to the remote service request is included in an extensible field of a special response frame.

Using the example provided in connection with special request frame 800 of FIG. 8A and special request frame 825 of FIG. 8B, if the server determines that information associated with the requested remote service type "357D" is comprised in the special request frame 800, the special response frame 850 can be generated in response to the special request frame 800 and communicated to the server. The special response frame 850 can comprise a value corresponding to the information associated with the requested remote service type "357D." For example, the information associated with the requested remote service type "357D" can be encoded to obtain the value "1245," which is to be included in the extensible field 860. Further, in response to the special request frame 825, the server can determine that a response to the request for remote service is "890C" (e.g., an encoded value for information that is responsive to the request for the remote service such as a weather condition, for example, cloudy, rainy, sunny, etc.), and the response is included in extensible field 885 of the special response frame 875. The value "890C" can correspond to a value mapped to a response. For example, the value "890C" can be a result of an encoding of the response to the request for the remote service. The value "890C" can correspond to a result to the query pertaining to query (or request) parameters "3A4C 58B1" (e.g., associated with the query Dec. 31, 2015 and Beijing) for a remote service corresponding to requested remote service type mapped to value "357D." The response value to be included in the extensible field 860 of special response frame 850 and extensible field 885 of special response frame 875 can be respectively determined based at least in part on one or more code books, one or more preset encoding rules (e.g., an encoding process), one or more mappings, etc.

In addition to the value "890C" corresponding to a response to the requested remote service, special response frame 850 can comprise a value (e.g., "1245") associated with the requested remote service. The other value (e.g., "1245") associated with the requested remote service can be comprised in extensible field 860 of special response frame 850. For example, the other value is associated with a status of the remote service (e.g., as distinct from the value "890C" that can be responsive to the query comprised in the special request frame).

According to various embodiments, in response to determining (e.g., generating) the one or more special request frames based at least in part on the requested remote service type and requested remote service content, the one or more special request frames are communicated. For example, in response to determining (e.g., generating) the one or more special request frames based at least in part on adding the requested remote service type and requested remote service to extensible fields of the one or more special request frames, the one or more special request frames are communicated. The one or more special request frames can be communicated to an access point. In response to obtaining the one or more special request frames, the access point can determine one or more servers to which to send the request for remote service. For example, the access point can determine one or more servers that provide a remote service associated with the one or more special request frames, and the access point can communicate the request for remote service (e.g., forward the special request frames, or information comprised in the extensible frames thereof). The access point can obtain information associated with the requested remote service from the one or more special request frames, and the access point can communicate to a corresponding server the information associated with the requested remote service that is obtained from the one or more special request frames.

Figure 9:
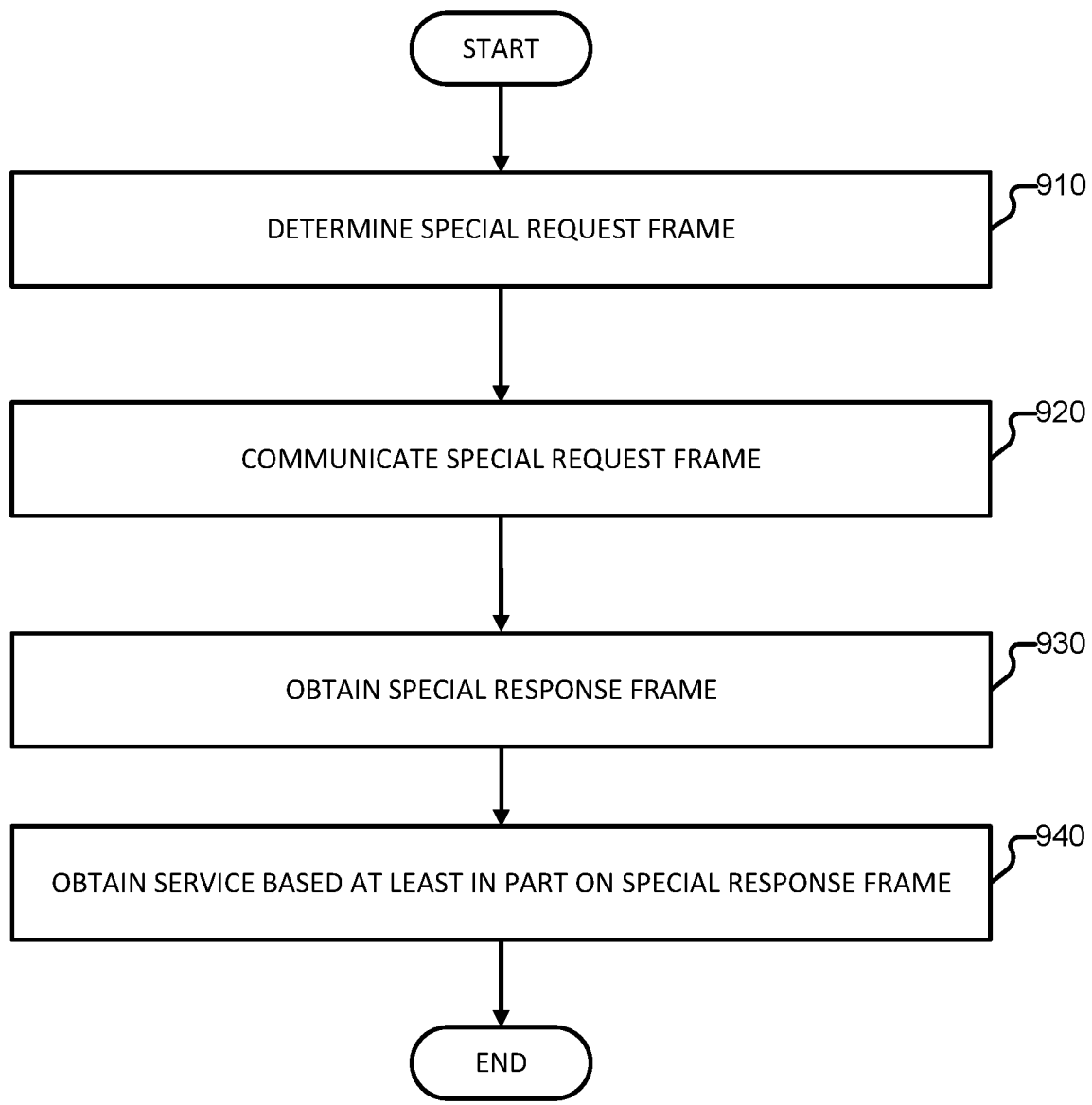
FIG. 9 is a flowchart of a method for requesting remote services according to various embodiments of the present application.

FIG. 9 is a flowchart of a method for requesting remote services according to various embodiments of the present application.

Referring to FIG. 9, process 900 is provided. Process 900 can be implemented in connection with process 200 of FIG. 2, process 1000 of FIG. 10, and/or process 1100 of FIG. 11. Process 900 can be implemented in connection with architecture 300 of FIG. 3A, special request frame 400 of FIG. 4A, special response frame 450 of FIG. 4B, special request frame 500 of FIG. 5A, special response frame 550 of FIG. 5B, special request frame 600 of FIG. 6A, special response frame 650 of FIG. 6B, special request frame 700 of FIG. 7A, special response frame 750 of FIG. 7B, special request frame 800 of FIG. 8A, special request frame 825 of FIG. 8B, special response frame 850 of FIG. 8C, and/or special response frame 875 of FIG. 8D. Process 900 can be implemented at least in part by system 100 of FIG. 1 and/or computer system 1200 of FIG. 12.

According to various embodiments, process 900 is implemented by an access point. In some embodiments, process 900 is implemented by a network device such as a router, etc.

Various embodiments include sending, to an access point, a special request frame to which was added the requested remote service type and the requested remote service content, and receiving a remote service response information sent back by the access point. In some embodiments, the terminal obtains a service (e.g., the requested service) based at least in part on the remote service response information.

At 910, a special request frame is determined. In some embodiments, the terminal determines the special request frame. In response to obtaining a request for a service (e.g., an indication that the terminal is to request a service), the terminal can obtain remote service request information, and the terminal can generate a special request frame. For example, the special request frame can be generated based at least in part on the remote service request information. The generating the special request frame can comprise adding the remote service request information to an extensible field in a special request frame. According to various embodiments, the terminal can store a template for a special request frame or a predefined special request frame format. In response to determining that a special request frame is to be generated, the terminal can generate the special request frame such that an extensible field of the special request frame comprises the remote service request information.

910 can correspond to 210 of process 200 of FIG. 2.

At 920, the special request frame is communicated. In some embodiments, the terminal communicates the special request frame. For example, the terminal communicates the special request frame to an access point and/or server. If the terminal communicates the service request frame to the access point, the access point can determine a corresponding server and send the request for the service to the server.

920 can correspond to 220 of process 200 of FIG. 2.

At 930, a special response frame is obtained. In some embodiments, the terminal obtains the special response frame from the access point. For example, the special response frame can comprise information that is responsive to the special request frame communicated by the terminal. According to various embodiments, the special response frame comprises information associated with a remote service that is responsive to information associated with the request for a service (e.g., a request for the remote service) comprised in the special request frame.

According to various embodiments, the special response frame is a response frame corresponding to the special request frame. For example, if the special request frame is a WiFi protocol probe frame, the special response frame is a WiFi protocol probe response frame. The special request frame and the special response frame can be communicated in an extensible field of a frame used in connection with mutual discovery (e.g., between the terminal and access point). As an example, if the special request frame is a WiFi protocol authentication frame, the special response frame is a WiFi protocol authentication response frame.

According to various embodiments, the access point generates the special response frame. For example, the access point includes information corresponding to a remote service in the special response frame. In some embodiments, the access point includes information corresponding to a remote service in an extensible field of the special response frame. The access point can receive the information corresponding to the remote service from one or more servers (e.g., a server that provides the remote service). In response to receiving the information corresponding to the remote service from one or more servers, the access point can generate the special response frame (e.g., in connection with providing the remote service to the terminal).

At 940, a service is obtained based at least in part on the special response frame. In some embodiments, the terminal can obtain information associated with the remote service from the special response frame. For example, the terminal obtains (e.g., extracts) the information associated with the remote service from an extensible field of the special response frame. The information associated with the remote service obtained from the special response frame can be responsive to the request for the remote service that the terminal communicated in connection with the special request frame.

The response to the request for the remote service is described in the context of the example of the remote weather service discussed above. Referring back to FIG. 4B, a special response frame 450 is provided. The special response frame 450 is obtained by the terminal. For example, the access point can communicate the special response frame 450 in response to obtaining information associated with the request for the remote service communicated in the special request frame 400. Extensible field 470 of special response frame 450 comprises remote service response information representing information pertaining to the request for the remote service. For example, in the context of the remote service being a weather service, the remote service response information comprises information pertaining to the weather service. If the response to the request of the weather service is clear, the remote service response information can correspond to an encoding of the responsive information. For example, the remote service response information can correspond to the looked-up weather result "clear."

In some embodiments, no default remote service is associated with the special request frame and/or special response frame. For example, the remote service request information includes the requested remote service type and the requested remote service content. According to various embodiments, the corresponding remote service response information includes information that is responsive to the requested remote service type and information that is responsive to the requested remote service content. For example, the corresponding remote service response information includes a response as to a status of the requested remote service type (e.g., an indication of whether the remote service type is obtainable) and the actually obtained remote service. If the remote service type is determined to be obtainable and the corresponding encoded result (e.g., the code representing that the remote service type is obtainable) is "1245," then the response as to whether the remote service type is obtainable is "1245." If the obtained weather condition is "clear" and the corresponding code is "890C," then the obtained remote service is "890C."

According to various embodiments, when remote service request information is added to an extensible field of a special request frame for terminal-access point mutual discovery, various implementations can be used for including responsive information in the special response frame. For example, remote service response information can be obtained from an extensible field of a special response frame according to various implementations.

In some embodiments, the remote service is obtained from an extensible field in the same special response frame, as the indication of the status of the remote service (e.g., the indication of whether the remote service is available or obtainable). In some embodiments, a response as to whether the remote service type is obtainable and the obtained remote service are obtained from the same extensible field of the same special response frame. FIGS. 5A and 5B illustrate an example of information pertaining to the remote service type and the requested remote service (e.g., one or more parameters corresponding to the requested remote service). Because the requested remote service type and the requested remote service content are contemporaneously (e.g., simultaneously) sent to the access point, the received response can be the obtained remote service, "890C." As illustrated in FIG. 5B, the encoded information pertaining to the remote service (e.g., "890C") is included in extensible field 570 of the special response frame 550. In some embodiments, the special response frame comprises information associated with the status of the remote service. For example, the special response frame comprises an indication of whether the remote service is available or obtainable. As illustrated in FIGS. 6A and 6B, the special response frame 650 differs from special response frame 550 illustrated in FIG. 5B because extensible field 670 of the special response frame 650 comprises the information associated with the status of the remote service (e.g., the encoded response "1245" indicating as to whether the remote service type is accessible or obtainable) in addition to including the remote service "890C." According to various embodiments, if information associated with the status of the remote service and information pertaining to the remote service (e.g., the information of the remote service that is responsive to the request for the remote service) are comprised in the same extensible field, the information associated with the status of the remote service and information pertaining to the remote service can be differentiated based at least in part on the respective positions of such information in the extensible field. For example, the special request frame and the special response frame can be configured according to one or more predefined configurations or rules (e.g., that define a location of certain information comprised in the special request frame and the special response frame, or the extensible fields thereof).

According to various embodiments, information associated with the status of the remote service and information pertaining to the remote service (e.g., the information of the remote service that is responsive to the request for the remote service) are comprised in different extensible fields of the same special response frame. For example, a response as to whether the remote service type is obtainable and the obtained remote service are fetched from different extensible fields of the same special response frame.

As illustrated in FIGS. 7A and 7B, if the sent remote service request information includes both code "357D" for "weather" and code "3A4C 58B1" for "Dec. 31, 2015 Beijing," and if encoded information are added to extensible field 720 and extensible field 730 as shown in FIG. 7A, then the corresponding special response frame 750 can comprise the codes "1245" and "890C" in extensible field 770 and extensible field 780, respectively.

According to various embodiments, information associated with the status of the remote service and information pertaining to the remote service (e.g., the information of the remote service that is responsive to the request for the remote service) are included in extensible fields of the different special response frame. For example, a response as to whether the remote service type is obtainable and the obtained remote service is fetched from the respective extensible fields of different special response frames. As an example, a response as to whether the remote service type is obtainable is fetched from an extensible field of a WiFi protocol probe response frame and the obtained remote service is fetched from an extensible field of a WiFi protocol authentication response frame.

As illustrated in FIGS. 8A and 8C, the special response frame 850 comprises "1245" in the extensible field 860 of the probe response frame 850 in response to special request frame 800. As illustrated in FIGS. 8B and 8D, the authentication response frame "890C" is included in extensible field 885 of special response frame 875.

According to various embodiments, process 900 comprises decoding fetched remote service response information to obtain a remote service response. For example, the obtaining the service based at least in part on the special response frame can comprise decoding the information comprised in the extensible field of the obtained special response frame.

According to various embodiments, the decoding is the reverse process of the encoding described above. The information obtained from the extensible field of the obtained special response frame can be decoded according to a predefined decoding process. As an example, a code is analyzed to extract the meaning represented by the code. Decoding can comprise referencing a codebook or predetermined encoding rules. For example, the remote service response information "890C" (e.g., obtained from the extensible field of the special response frame) is looked up in a codebook to obtain a corresponding meaning (e.g., the meaning being "clear").

According to various embodiments, remote service request information is included in an extensible field of a special request frame that is used for terminal-access point mutual discovery. The special request frame exists (e.g., is used in a protocol according to which the terminal and access point communicate) even when a normal connection between the terminal and the network (e.g., the access point) cannot be established. Therefore, if the terminal cannot establish a normal connection with the network (e.g., if the terminal is operating under conditions of resource constraint), remote service request information can be communicated to an access point. In response to receiving the remote service request information, the access point uses the remote service request information as a basis to request the corresponding remote service provided by a remote server. The terminal thus successfully obtains the remote service under conditions of resource constraint.

According to various embodiments, the terminal obtains a remote navigation service based at least in part on communicating a request for remote service and obtaining the remote service in a special request frame and/or special response frame that is used in connection with mutual discovery. For example, if the terminal is a vehicle-mounted terminal, and the remote service is a remote navigation service, when the terminal is unable to establish a normal connection with the network, the terminal obtains the remote navigation service using the special request frame and/or special response frame that is used in connection with mutual discovery.

As an example, while driving, a driver may require continuous navigation service. However, the vehicle may pass through different areas while driving. The network signals will generally be better in some areas and worse in other areas. In poor signal areas, the terminal may be unable to obtain navigation service via a normal network connection. Various embodiments provide a method for requesting navigation information when the connection is lost during an electronic navigation process. For example, the access point can provide service information to the terminal by providing information in the special response frames or frames used in the mutual discovery process, such that the terminal does not communicate with the specific web server providing the service, etc.

According to various embodiments, the terminal obtains a remote service in a home alarm installation context. For example, the terminal is a home alarm installation, and the remote service is a remote alarm service.

The home alarm installation can have a camera. In response to the camera (or a computer connected to the camera) detecting a sudden change or the appearance of a stranger in the scene that the camera is filming, the home alarm installation alerts (e.g., communicates the anomaly to) the alarm server, and the alarm server notifies the homeowner who can be co-located with respect to the home (e.g., the homeowner can be at work, or otherwise away from home, etc.). However, if a burglary occurs at home and the home alarm installation is not able to alert the alarm server because of poor network signals at home, various embodiments are implemented to obtain the remote alarm service. For example, if poor network conditions or signals exist, the terminal can obtain service through use of the mutual discovery process. The terminal can communicate with an access point in the mutual discovery process (e.g., using a special request frame) and the terminal can request service information in connection with the mutual discovery process (e.g., using the special request frame). The access point can obtain responsive service information and provide corresponding service to the terminal in connection with the mutual discovery process (e.g., using the special response frame, etc.).

Figure 10:
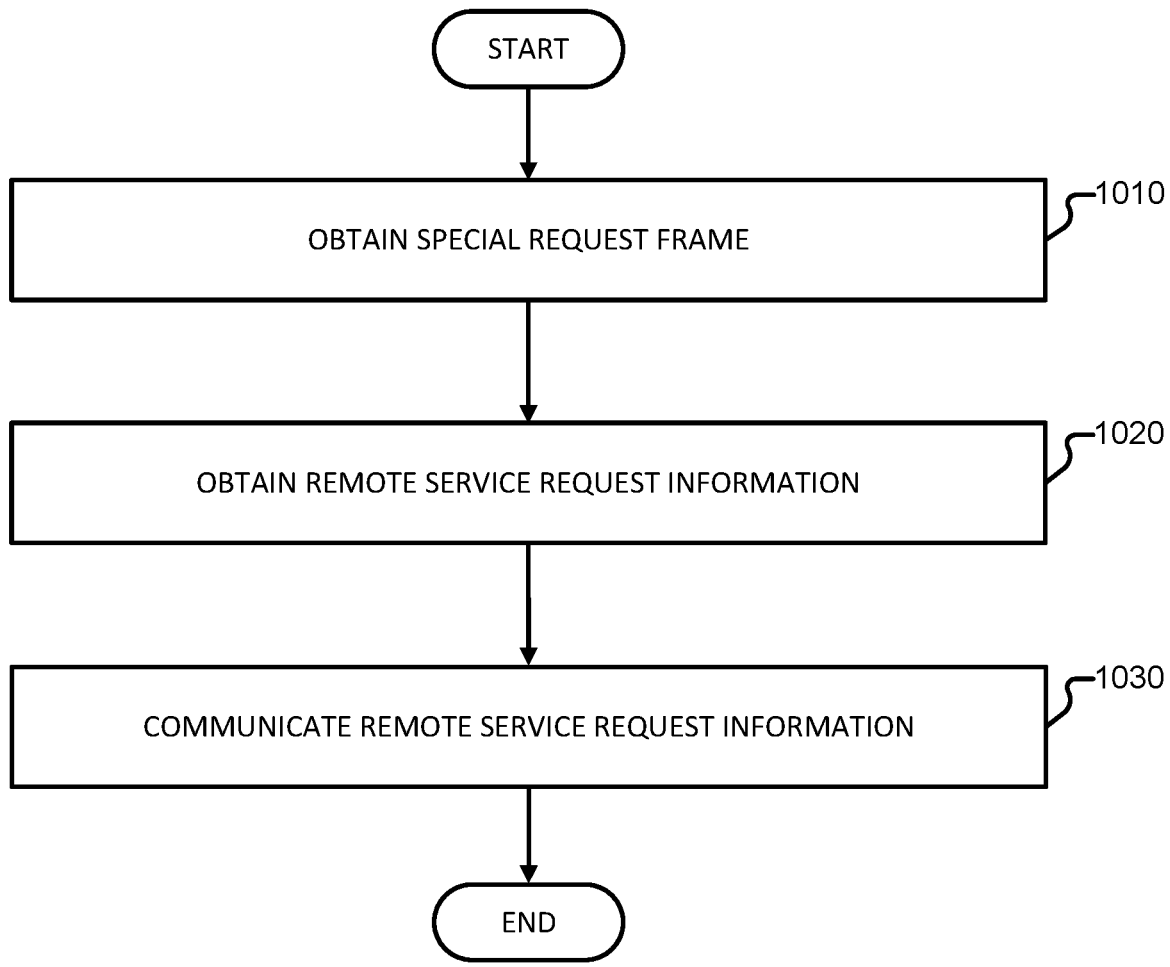
FIG. 10 is a flowchart of a method for processing remote service requests according to various embodiments of the present application.

FIG. 10 is a flowchart of a method for processing remote service requests according to various embodiments of the present application.

Referring to FIG. 10, process 1000 is provided. Process 1000 can be implemented in connection with process 200 of FIG. 2, process 900 of FIG. 9, and/or process 1100 of FIG. 11. Process 1000 can be implemented in connection with architecture 300 of FIG. 3A, special request frame 400 of FIG. 4A, special response frame 450 of FIG. 4B, special request frame 500 of FIG. 5A, special response frame 550 of FIG. 5B, special request frame 600 of FIG. 6A, special response frame 650 of FIG. 6B, special request frame 700 of FIG. 7A, special response frame 750 of FIG. 7B, special request frame 800 of FIG. 8A, special request frame 825 of FIG. 8B, special response frame 850 of FIG. 8C, and/or special response frame 875 of FIG. 8D. Process 1000 can be implemented at least in part by system 100 of FIG. 1 and/or computer system 1200 of FIG. 12.

According to various embodiments, process 1000 is implemented by an access point. In some embodiments, process 1000 is implemented by a network device such as a router, etc.

At 1010, a special request frame is obtained. In some embodiments, the access point obtains the special request frame. For example, the access point obtains the special request frame from a terminal. The terminal can communicate the special request frame in connection with a mutual discovery process. The special request frame can be configured based at least in part on the communication protocol according to which the terminal and access point communicate. As an example, the special request frame corresponds to a frame that is used in connection with a mutual discovery process supported by the communication protocol according to which the terminal and access point communicate.

At 1020, remote service request information is obtained. The remote service request information can be obtained in response to the special request being obtained. According to various embodiments, the remote service request information is obtained based at least in part on the special request frame. For example, the remote service request information can be comprised in one or more fields of the special request frame. In some embodiments, the remote service request information is included in an extensible field of the special request frame. In response to receiving the special request frame from the terminal in connection with a terminal-access point mutual discovery, the access point obtains (e.g., extracts) the remote service request information from the extensible field of the special request frame.

At 1030, remote service request information is communicated. According to various embodiments, the remote service request information is sent to a remote server (e.g., via one or more networks). As an example, the access point determines a remote server associated with the remote service request information and communicates the remote service request information to the remote server. For example, remote service request information can comprise an indication of the remote server (e.g., an identifier associated with the remote server). As another example, the remote service request information can comprise an indication of a remote service (e.g., an identifier associated with the remote service), and a mapping of remote services to remote servers can be queries to determine the remote server.

As an example, the special request frame for terminal-access point mutual discovery obtained at 1010 corresponds to a probe frame and an authentication frame in WiFi protocol or a special discovery frame in Bluetooth protocol. The special request frame can be a variable-length frame. As shown in FIGS. 5A, 6A, 7A, and 8A and 8B, encoded remote service request information is included in (e.g., added to) an extensible field of the special request frame.

According to various embodiments, the remote service request information includes the requested remote service type and the requested remote service content. Remote service request information can be added to an extensible field of a special request frame for terminal-access point mutual discovery according to various implementations.

In some embodiments, the obtaining of the remote service information comprises obtaining the remote service type and remote service content from the same extensible field of the same special request frame. For example, with regard to FIG. 5A, the code "357D" for "weather" and the code "3A4C 58B1" for "Dec. 31, 2015 Beijing" are obtained (e.g., extracted) from the same extensible field 520 of the same special request frame 500.

In some embodiments, the obtaining of the remote service information comprises obtaining the remote service type and remote service content separately from different extensible fields of the same special request frame. For example, with regard to FIG. 7A, code "3A4C 58B1" for "Dec. 31, 2015 Beijing" is obtained (e.g., extracted) from extensible field 730 in special request frame 700, and code "357D" for "weather" is obtained (e.g., extracted) from extensible field 720 in the same special request frame 700.

In some embodiments, the obtaining of the remote service information comprises obtaining the remote service type and remote service content from the respective extensible fields of different special request frames. For example, the remote service type is fetched from extensible field 810 of WiFi protocol probe frame 800 in FIG. 8A, and remote service content is fetched from extensible field 835 of WiFi protocol authentication frame 825 in FIG. 8B.

Figure 11:
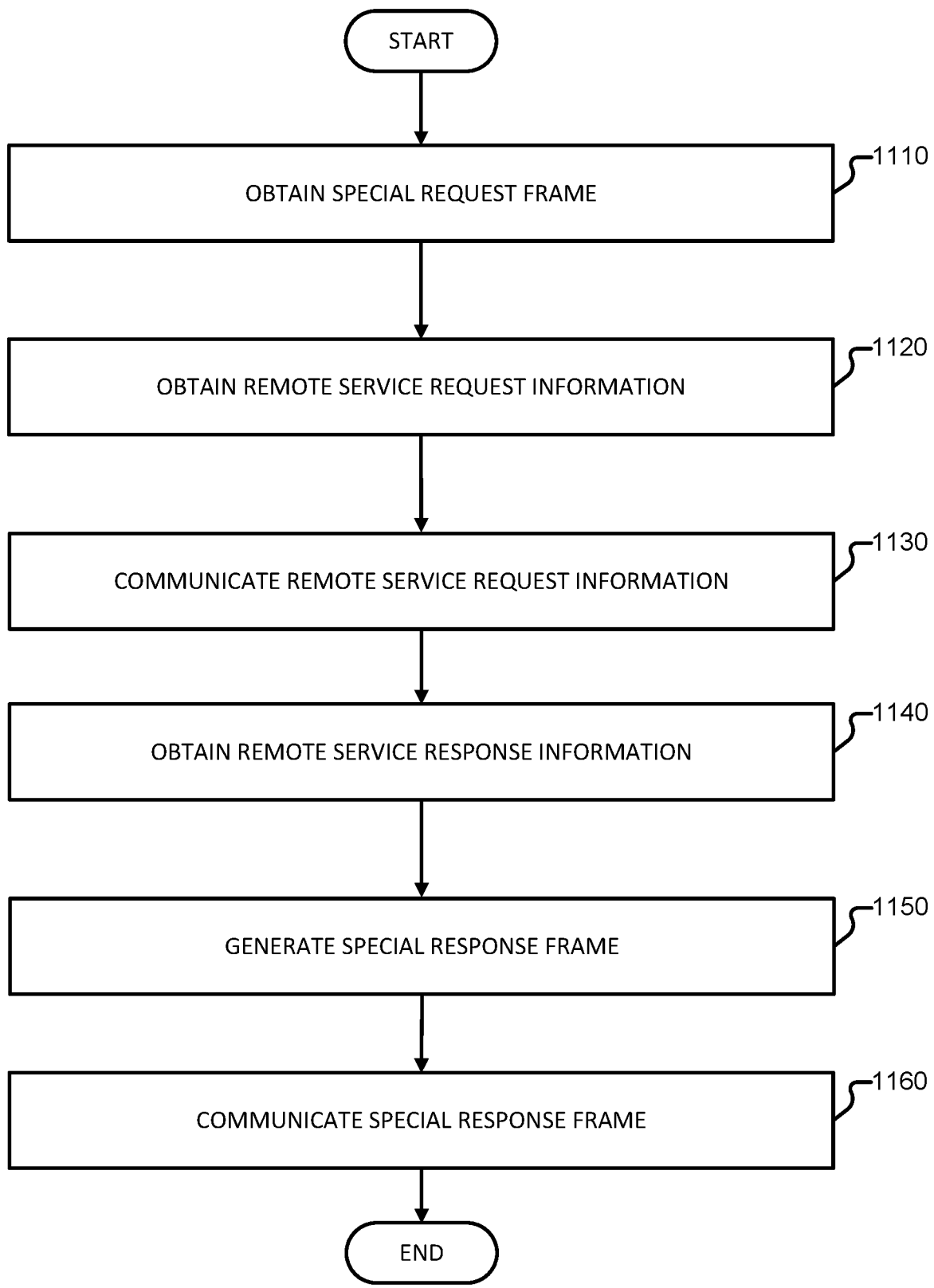
FIG. 11 is a flowchart of a method for processing remote service requests according to various embodiments of the present application.

FIG. 11 is a flowchart of a method for processing remote service requests according to various embodiments of the present application.

Referring to FIG. 11, process 1100 is provided. Process 1100 can be implemented in connection with process 200 of FIG. 2, process 900 of FIG. 9, and/or process 1000 of FIG. 10. Process 1100 can be implemented in connection with architecture 300 of FIG. 3A, special request frame 400 of FIG. 4A, special response frame 450 of FIG. 4B, special request frame 500 of FIG. 5A, special response frame 550 of FIG. 5B, special request frame 600 of FIG. 6A, special response frame 650 of FIG. 6B, special request frame 700 of FIG. 7A, special response frame 750 of FIG. 7B, special request frame 800 of FIG. 8A, special request frame 825 of FIG. 8B, special response frame 850 of FIG. 8C, and/or special response frame 875 of FIG. 8D. Process 1100 can be implemented at least in part by system 100 of FIG. 1 and/or computer system 1200 of FIG. 12.

According to various embodiments, process 1100 is implemented by an access point. In some embodiments, process 1100 is implemented by a network device such as a router, etc.

At 1110, a special request frame is obtained. In some embodiments, the access point obtains the special request frame. For example, the access point obtains the special request frame from a terminal. The terminal can communicate the special request frame in connection with a mutual discovery process. The special request frame can be configured based at least in part on the communication protocol according to which the terminal and access point communicate. As an example, the special request frame corresponds to a frame that is used in connection with a mutual discovery process supported by the communication protocol according to which the terminal and access point communicate.

At 1120, remote service request information is obtained. The remote service request information can be obtained in response to the special request being obtained. According to various embodiments, the remote service request information is obtained based at least in part on the special request frame. For example, the remote service request information can be included in one or more fields of the special request frame. In some embodiments, the remote service request information is included in an extensible field of the special request frame. In response to receiving the special request frame from the terminal in connection with a terminal-access point mutual discovery, the access point obtains (e.g., extracts) the remote service request information from the extensible field of the special request frame.

At 1130, remote service request information is communicated. According to various embodiments, the remote service request information is sent to a remote server (e.g., via one or more networks). As an example, the access point determines a remote server associated with the remote service request information and communicates the remote service request information to the remote server. For example, remote service request information can comprise an indication of the remote server (e.g., an identifier associated with the remote server). As another example, the remote service request information can comprise an indication of a remote service (e.g., an identifier associated with the remote service), and a mapping of remote services to remote servers can be queries to determine the remote server.

At 1140, remote service response information is obtained. According to various embodiments, the remote service response information is obtained from the server (e.g., the remote server). For example, in response to receiving the remote service request information, the server determines information (e.g., remote service response information) that is responsive to remote service response information.

According to various embodiments, the remote service response information comprises a response indicating a status of the remote service (e.g., an indication of whether the remote service type is available) and the obtained remote service (e.g., information that is responsive to the request for the remote service).

At 1150, a special response frame is generated. In some embodiments, the special response frame is generated based at least in part on the remote service response information. For example, the generating the special response frame comprises adding the remote service response information to an extensible field in a special response frame for terminal-access point mutual discovery.

According to various embodiments, the special response frame is a response frame corresponding to the special request frame. For example, if the special request frame is a WiFi protocol probe frame, the special response frame is a WiFi protocol probe response frame. As another example, if the special request frame is a WiFi protocol authentication frame, the special response frame is a WiFi protocol authentication response frame.

The implementation of obtaining the remote service request information from an extensible field of a special request frame corresponding to the implementation of adding the remote service response information to an extensible field in a special response frame for terminal-access point mutual discovery is as follows:

If the remote service type and remote service content are obtained from the same extensible field of the same special request frame, then the response as to the status of the remote service type (e.g., the response as to whether the remote service type is available) and the obtained remote service can be correspondingly added to the same extensible field of the same special response frame.

If the remote service type and remote service content are separately fetched from different extensible fields of the same special request frame, then the response as to the status of the remote service type (e.g., the response as to whether the remote service type is available) and the obtained remote service can be correspondingly added separately to different extensible fields of the same special response frame.

If the remote service type and remote service content are fetched from the respective extensible fields of different special request frames, then the response as to the status of the remote service type (e.g., the response as to whether the remote service type is available) and the obtained remote service can be correspondingly separately added to corresponding extensible fields of different special response frames. For example, if the remote service type is fetched from an extensible field of a WiFi protocol probe frame, then a response as to whether the remote service type is available is correspondingly added to an extensible field of a WiFi protocol probe response frame. If the remote service content is fetched from an extensible field of a WiFi protocol authentication frame, then the adding of the response as to whether the remote service type is available and the obtained remote service to the respective extensible fields in different special response frames includes: adding the obtained remote service to an extensible field of a WiFi protocol authentication response frame.

At 1160, the special response frames are communicated. In some embodiments, the special response frame is sent to a terminal (e.g., the terminal from which the special request frame is obtained). In response to receiving the special response frame, the terminal can obtain the remote service. For example, the terminal extracts remote service request information from the general special response frame (e.g., the extensible frame in the special response frame).

Figure 12:
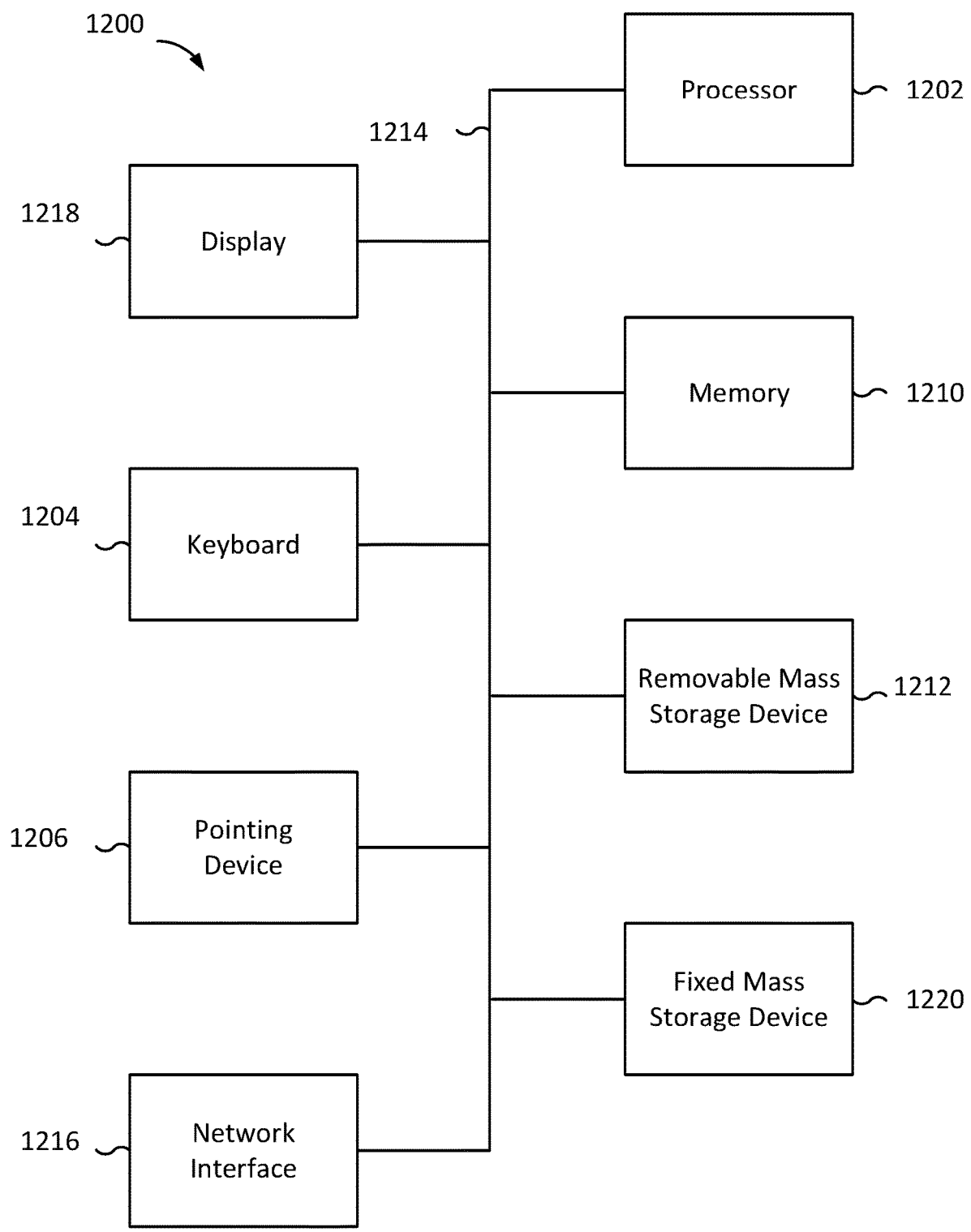
FIG. 12 is a functional diagram of a computer system for processing remote service requests according to various embodiments of the present application.

FIG. 12 is a functional diagram of a computer system for processing remote service requests according to various embodiments of the present application.

Referring to FIG. 12, computer system 1200 for processing remote service is provided. Computer system 1200 can be implemented in connection with process 200 of FIG. 2, process 900 of FIG. 9, process 1000 of FIG. 10, and/or process 1100 of FIG. 11. For example, computer system 1200 can implement all or part of process 200 of FIG. 2, process 900 of FIG. 9, process 1000 of FIG. 10, and/or process 1100 of FIG. 11. Computer system 1200 can be implemented in connection with architecture 300 of FIG. 3A, special request frame 400 of FIG. 4A, special response frame 450 of FIG. 4B, special request frame 500 of FIG. 5A, special response frame 550 of FIG. 5B, special request frame 600 of FIG. 6A, special response frame 650 of FIG. 6B, special request frame 700 of FIG. 7A, special response frame 750 of FIG. 7B, special request frame 800 of FIG. 8A, special request frame 825 of FIG. 8B, special response frame 850 of FIG. 8C, and/or special response frame 875 of FIG. 8D. Computer system 1200 can implemented at least part of system 100 of FIG. 1.

Computer system 1200, which includes various subsystems as described below, includes at least one microprocessor subsystem (also referred to as a processor or a central processing unit (CPU)) 1202. For example, processor 1202 can be implemented by a single-chip processor or by multiple processors. In some embodiments, processor 1202 is a general purpose digital processor that controls the operation of the computer system 1200. Using instructions retrieved from memory 1210, the processor 1202 controls the reception and manipulation of input data, and the output and display of data on output devices (e.g., display 1218).

Processor 1202 is coupled bi-directionally with memory 1210, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1202. Also as is well known in the art, primary storage typically includes basic operating instructions, program code, data, and objects used by the processor 1202 to perform its functions (e.g., programmed instructions). For example, memory 1210 can include any suitable computer-readable storage media, described below, depending on whether, for example, data access needs to be bi-directional or uni-directional. For example, processor 1202 can also directly and very rapidly retrieve and store frequently needed data in a cache memory (not shown). The memory can be a non-transitory computer-readable storage medium.

A removable mass storage device 1212 provides additional data storage capacity for the computer system 1200, and is coupled either bi-directionally (read/write) or uni-directionally (read only) to processor 1202. For example, storage 1212 can also include computer-readable media such as magnetic tape, flash memory, PC-CARDS, portable mass storage devices, holographic storage devices, and other storage devices. A fixed mass storage 1220 can also, for example, provide additional data storage capacity. The most common example of mass storage 1220 is a hard disk drive. Mass storage device 1212 and fixed mass storage 1220 generally store additional programming instructions, data, and the like that typically are not in active use by the processor 1202. It will be appreciated that the information retained within mass storage device 1212 and fixed mass storage 1220 can be incorporated, if needed, in standard fashion as part of memory 1210 (e.g., RAM) as virtual memory.

In addition to providing processor 1202 access to storage subsystems, bus 1214 can also be used to provide access to other subsystems and devices. As shown, these can include a display monitor 1218, a network interface 1216, a keyboard 1204, and a pointing device 1206, as well as an auxiliary input/output device interface, a sound card, speakers, and other subsystems as needed. For example, the pointing device 1206 can be a mouse, stylus, track ball, or tablet, and is useful for interacting with a graphical user interface.

The network interface 1216 allows processor 1202 to be coupled to another computer, computer network, or telecommunications network using a network connection as shown. For example, through the network interface 1216, the processor 1202 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1202 can be used to connect the computer system 1200 to an external network and transfer data according to standard protocols. For example, various process embodiments disclosed herein can be executed on processor 1202, or can be performed across a network such as the Internet, intranet networks, or local area networks, in conjunction with a remote processor that shares a portion of the processing. Additional mass storage devices (not shown) can also be connected to processor 1202 through network interface 1216.

An auxiliary I/O device interface (not shown) can be used in conjunction with computer system 1200. The auxiliary I/O device interface can include general and customized interfaces that allow the processor 1202 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 12 is but an example of a computer system suitable for use with the various embodiments disclosed herein. Other computer systems suitable for such use can include additional or fewer subsystems. In addition, bus 1214 is illustrative of any interconnection scheme serving to link the subsystems. Other computer architectures having different configurations of subsystems can also be utilized.

A machine-readable medium is further provided according to an embodiment of the present application and stored on this medium are executable instructions. When said executable instructions are executed, a machine is caused to execute the method for processing remote service requests, which is described above.

Please note that the present application may be implemented as software and/or a combination of software and hardware. For example, it may be implemented using application-specific integrated circuits (ASIC), general-purpose computers, or any other similar hardware apparatus. In an embodiment, the software program of the present application may use processors to implement the steps or functions described above. Similarly, the software program (including associated data structures) of the present application may be stored in computer-readable recording media such as RAM storage devices, magnetic or optical drives, floppy disks, or similar equipment. In addition, some of the steps or functions of the present application may be implemented through hardware, e.g., circuits that in combination with processors execute various steps or functions.

In addition, a portion of the present application may be applied to computer program products, e.g., computer program instructions. When they are executed by a computer, they may, through operations of the computer, invoke or provide methods and/or technical schemes based on the present application. The program instructions for invoking methods of the present application may be stored in fixed or movable recording media and/or transmitted by broadcasting or by datastreams in other signal-carrying media and/or stored in working memory of a computer apparatus run according to said program instructions. An embodiment of the present application hereby comprises a means. This means comprises memory used to store computer program instructions and a processor used to execute program instructions, wherein, when these computer program instructions are executed by the processor, the means is triggered to run methods and/or technical schemes based on the multiple, previously described embodiments according to the present application.

For persons skilled in the art, the present application is obviously not limited to the details of the exemplary embodiments described above. Moreover, the present application can be realized in other specific forms without deviating from the spirit or basic features of the present application. Therefore, regardless of how one views them, all the embodiments should be regarded as exemplary and non-restrictive. The scope of the present application is limited by the claims and not by the description above. Therefore, all variations that fall within the meaning and scope of equivalents to the claims are to be included within the present application. No drawing reference sign for a claim shall be regarded as restricting the related claim. In addition, obviously the word "comprise" or "include" does not exclude other units or steps, and the singular does not exclude the plural. Multiple units or devices described in the system claims may also be realized through software or hardware by one unit or device. The terms "first," "second," and so on are for naming purposes and do not indicate any specific sequence.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining, by one or more processors associated with a terminal, a special request frame, wherein:
      the special request frame comprises a first extensible field;
      the first extensible field comprises remote service request information;
      the remote service request information comprises:
         information that is indicative of a server to which a remote service request for a remote service is to be sent; and
         information that is indicative of a specific query with respect to the remote service to be obtained from the server;
      the special request frame corresponds to a frame for terminal-access point mutual discovery according to a communication protocol for communication between the terminal and an access point;
      the determining the special request frame comprises adding the remote service request information to the first extensible field of the special request frame in response to determining that the terminal is unable to establish a communication connection with the server due to one or more resource constraints; and
      the one or more resource constraints comprise one or more of:
         an inability to connect with a trusted network to establish the communication connection with the server via the trusted network;
         an inability to establish a network connection because of insufficient power; and
         not having a module supporting a launch of the remote service;
   communicating, via a communication interface associated with the terminal, the special request frame to the access point; and
   obtaining, by the one or more processors associated with the terminal, information pertaining to the remote service provided by the server, wherein:
      the information pertaining to the remote service is obtained by the terminal via the access point;
      the obtaining information pertaining to the remote service is based at least in part on a determination of the server from which to obtain the remote service;
      the access point determines the server from which to obtain the remote service, wherein the server is determined based at least in part on the information that is indicative of the server, the information being comprised in the remote service request information;
      the information pertaining to the remote service is responsive to the specific query comprised in the remote service request information, wherein the information pertaining to the remote service is determined based at least in part on the remote service request comprising the specific query with respect to the remote service, and the remote service request is sent by the access point to the server;
      at least part of the remote service is obtained from a second extensible field of a special response frame;
      the special response frame is communicated by the access point; and
      the special response frame is a frame for the terminal-access point mutual discovery according to the communication protocol for communication between the terminal and the access point.

2. The method of claim 1, further comprising:
   receiving the special response frame from the access point,
   wherein the obtaining the remote service comprises obtaining remote service response information from the second extensible field of the special response frame.

3. The method of claim 1, wherein:
   the adding the remote service request information to the first extensible field of the special request frame comprises:
      encoding a remote service request to obtain remote server request information; and adding the remote service request information to the first extensible field of the special request frame.

4. The method of claim 1, further comprising:
receiving the special response frame from the access point, the special response frame comprising the second extensible field, and the second extensible field comprises remote service response information; and
decoding the remote service response information to obtain a remote service response.

5. The method of claim 1, wherein:
the remote service request information comprises a requested remote service type and a requested remote service content;
the requested remote service type and the requested remote service content are included in respective extensible fields of different special request frames;
the obtaining the remote service comprises receiving the special response frame, the special response frame comprising remote service response information;
the remote service response information comprising an indication of a status of the remote service type and the remote service; and
the indication of the status of the remote service type and the remote service are obtained from respective extensible fields of different special response frames.

6. The method of claim 5, wherein:
the requested remote service type is included in an extensible field of a WiFi protocol probe frame and the requested remote service content is included in an extensible field of a WiFi protocol authentication frame; and
the indication of the status of the remote service type is included in an extensible field of a WiFi protocol probe response frame, and the remote service is included in an extensible field of a WiFi protocol authentication response frame.

7. The method claim 1, wherein:
the remote service request information comprises a requested remote service type and a requested remote service content;
the requested remote service type and the requested remote service content are comprised in different extensible fields in a same special request frame;
the obtaining the remote service comprises receiving the special response frame, the special response frame comprising remote service response information;
the remote service response information comprising an indication of a status of the remote service type and the remote service; and
the indication of the status of the remote service type and the remote service are obtained from different extensible fields of a same special response frame.

8. The method of claim 1, wherein:
the remote service request information comprises a requested remote service type and a requested remote service content;
the requested remote service type and the requested remote service content being comprised in a same extensible field in a same special request frame;
the obtaining the remote service comprises receiving the special response frame, the special response frame comprising remote service response information;
the remote service response information comprising an indication of a status of the remote service type and the remote service; and the indication of the status of the remote service type and the remote service being comprised in a same extensible field of a same special response frame.

9. The method of claim 1, wherein the terminal is a vehicle-mounted terminal, and the remote service is a remote navigation service.

10. The method of claim 1, wherein the terminal is a home alarm installation, and the remote service is a remote alarm service.

11. The method of claim 1, further comprising:
determining, by the one or more processors associated with the terminal, that the trusted network is not available for connection or that the terminal is unable to establish a network connection to a network;
wherein in response to a determination that the trusted network is not available for connection or that the terminal is unable to establish the network connection to the network, the terminal uses the access point as a proxy for the server in connection with:
communicating the remote service request information via at least the first extensible field of the special request frame; and
obtaining the information pertaining to the remote service via at least the second extensible field of the special response field.

12. The method of claim 1, wherein:
the information that is indicative of the server to which the remote service request is to be sent comprises an identifier corresponding to the server; and
the information that is indicative of the specific query with respect to the remote service to be obtained from the server comprises a string pertaining to information to be requested from the server.

13. The method of claim 12, wherein:
in response to obtaining the special request frame the access point determines the server to which the remote service request is to be sent based at least in part on using the identifier corresponding to the server in connection with performing a lookup in a mapping of identifier to third party servers that respectively provide subscription services or location based services.

14. The method of claim 1, wherein the information that is indicative of the server to which the remote service request is to be sent comprises an address of the server.

15. The method of claim 1, wherein the remote service comprises a value pertaining to a location-based service or a subscription service that is provided to the terminal by the server via the special response frame.

16. A method, comprising:
obtaining, by one or more processors associated with an access point, a special request frame from a terminal, wherein:
the special request frame comprising a first extensible field;
the first extensible field comprising remote service request information;
the remote service request information comprises:
information that is indicative of a server to which a remote service request for a remote service is to be sent; and
information that is indicative of a specific query with respect to the remote service to be obtained from the server;
the special request frame corresponds to a frame for terminal-access point mutual discovery according to a communication protocol for communication between the terminal and an access point;

the remote service request information is added to the first extensible field of the special request frame in response to a determination that the terminal is unable to establish a communication connection with the server due to one or more resource constraints; and the one or more resource constraints comprise one or more of:
  an inability to connect with a trusted network to establish the communication connection with the server via the trusted network;
  an inability to establish a network connection because of insufficient power; and
  not having a module supporting a launch of the remote service;

in response to obtaining the special request frame, obtaining, by the one or more processors, the remote service request information from the first extensible field of the special request frame;

sending, by the one or more processors, the remote service request to the server, wherein:
  the access point determines the server to which the remote service request is to be sent;
  the server is determined based at least in part on the information that is indicative of the server, the information being comprised in the remote service request information; and
  the remote service request comprises the specific query with respect to the remote service; and providing, by the one or more processors, information pertaining to the remote service to the terminal, wherein:
  the information pertaining to the remote service is responsive to the specific query comprised in the remote service request information, wherein the information pertaining to the remote service is determined based at least in part on the remote service request comprising the specific query with respect to the remote service;
  at least part of the information pertaining to the remote service is provided in a second extensible field of a special response frame;
  the special response frame is communicated by the access point; and
  the special response frame is a frame for the terminal-access point mutual discovery according to the communication protocol for communication between the terminal and the access point.

17. The method of claim 16, further comprising:
obtaining remote service response information from the server;
determining the special response frame, the special response frame comprising the remote service response information in the second extensible field of the special response frame; and
sending the special response frame to the terminal.

18. The method of claim 17, wherein:
the remote service request information comprises a requested remote service type and requested remote service content;
the requested remote service type and the requested remote service content are comprised in respective extensible fields of different special request frames;
the remote service response information comprising an indication of a status of the remote service type and the remote service; and
the indication of the status of the remote service type and the remote service are comprised in respective extensible fields of different special response frames.

19. The method of claim 18, further comprising:
obtaining the remote service type from an extensible field of a WiFi protocol probe frame;
obtaining the remote service content from an extensible field of a WiFi protocol authentication frame;
adding the indication of the status of the remote service type to an extensible field of a WiFi protocol probe response frame; and
adding the remote service to an extensible field of a WiFi protocol authentication response frame.

20. The method of claim 17, wherein:
the remote service request information comprises a requested remote service type and requested remote service content;
the requested remote service type and the requested remote service content are comprised in different extensible fields in a same special request frame;
the remote service response information comprising an indication of a status of the remote service type and the remote service; and
the indication of the status of the remote service type and the remote service are comprised in different extensible fields of a same special response frame.

21. The method of claim 17, wherein:
the remote service request information comprises a requested remote service type and requested remote service content;
the requested remote service type and the requested remote service content being comprised in a same extensible field in a same special request frame;
the remote service response information comprising an indication of a status of the remote service type and the remote service; and
the indication of the status of the remote service type and the remote service being comprised in a same extensible field of a same special response frame.

22. A terminal, comprising:
one or more processors configured to:
  determine a special request frame, wherein:
    the special request frame comprises a first extensible field;
    the first extensible field comprises remote service request information;
    the remote service request information comprises:
      information that is indicative of a server to which a remote service request for a remote service is to be sent; and
      information that is indicative of a specific query with respect to the remote service to be obtained from the server;
    the special request frame corresponds to a frame for terminal-access point mutual discovery according to a communication protocol for communication between the terminal and an access point;
    the determining the special request frame comprises adding the remote service request information to the first extensible field of the special request frame in response to determining that the terminal is unable to establish a communication connection with the server due to one or more resource constraints; and
    the one or more resource constraints comprise one or more of:

an inability to connect with a trusted network to establish the communication connection with the server via the trusted network;

an inability to establish a network connection because of insufficient power; and not having a module supporting a launch of the remote service;

communicate, via a communication interface, the special request frame to the access point; and obtain the remote service provided by a server, wherein:

the remote service is obtained by the terminal via the access point;

to obtain information pertaining to the remote service is based at least in part on a determination of the server from which to obtain the remote service;

the access point determines the server from which to obtain the remote service, wherein the server is determined based at least in part on the information that is indicative of the server, the information being comprised in the remote service request information;

the information pertaining to the remote service is responsive to the specific query comprised in the remote service request information, wherein the information pertaining to the remote service is determined based at least in part on the remote service request comprising the specific query with respect to the remote service, and the remote service request is sent by the access point to the server;

at least part of the remote service is obtained from a second extensible field of a special response frame;

the special response frame is communicated by the access point; and the special response frame is a frame for the terminal-access point mutual discovery according to the communication protocol for communication between the terminal and the access point; and one or more memories coupled to the one or more processors, configured to provide the one or more processors with instructions.

23. A computer program product, the computer program product being embodied in a non-transitory computer readable storage medium and comprising computer instructions for:

determining, by one or more processors associated with a terminal, a special request frame, wherein:

the special request frame comprises a first extensible field;

the first extensible field comprises remote service request information;

the remote service request information comprises:

information that is indicative of a server to which a remote service request for a remote service is to be sent; and information that is indicative of a specific query with respect to the remote service to be obtained from the server;

the special request frame corresponds to a frame for terminal-access point mutual discovery according to a communication protocol for communication between the terminal and an access point;

the determining the special request frame comprises adding the remote service request information to the first extensible field of the special request frame in response to determining that the terminal is unable to establish a communication connection with the server due to one or more resource constraints; and the one or more resource constraints comprise one or more of:

an inability to connect with a trusted network to establish the communication connection with the server via the trusted network;

an inability to establish a network connection because of insufficient power; and not having a module supporting a launch of the remote service;

communicating, by the one or more processors associated with the terminal, the special request frame to the access point; and obtaining, by the one or more processors associated with the terminal, information pertaining to the remote service provided by the server, wherein:

the information pertaining to the remote service is obtained by the terminal via the access point;

the obtaining information pertaining to the remote service is based at least in part on a determination of the server from which to obtain the remote service;

the access point determines the server from which to obtain the remote service, wherein the server is determined based at least in part on the information that is indicative of the server, the information being comprised in the remote service request information;

the information pertaining to the remote service is responsive to the specific query comprised in the remote service request information, wherein the information pertaining to the remote service is determined based at least in part on the remote service request comprising the specific query with respect to the remote service, and the remote service request is sent by the access point to the server;

at least part of the remote service is obtained from a second extensible field of a special response frame;

the special response frame is communicated by the access point; and the special response frame is a frame for the terminal-access point mutual discovery according to the communication protocol for communication between the terminal and the access point.

* * * * *